US012777257B2

(12) United States Patent
Jiang et al.

(10) Patent No.: US 12,777,257 B2
(45) Date of Patent: Oct. 27, 2026

(54) PANORAMIC CAMERA

(71) Applicant: KANDAO TECHNOLOGY CO., LTD., Shenzhen (CN)

(72) Inventors: Jiebiao Jiang, Shenzhen (CN); Dehuan Zhang, Shenzhen (CN)

(73) Assignee: KANDAO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/265,090

(22) Filed: Jul. 10, 2025

(65) Prior Publication Data

US 2025/0338027 A1 Oct. 30, 2025

Related U.S. Application Data

(63) Continuation of application No. PCT/CN2023/079386, filed on Mar. 2, 2023.

(30) Foreign Application Priority Data

Jan. 10, 2023 (CN) ......................... 202310034078.4

(51) Int. Cl.
*H04N 23/698* (2023.01)
*H04N 23/51* (2023.01)
*H04N 23/52* (2023.01)
*H04N 23/90* (2023.01)

(52) U.S. Cl.
CPC ........... *H04N 23/698* (2023.01); *H04N 23/51* (2023.01); *H04N 23/52* (2023.01); *H04N 23/90* (2023.01)

(58) Field of Classification Search
None
See application file for complete search history.

(56) References Cited

U.S. PATENT DOCUMENTS

2017/0078647 A1 3/2017 Van Hoff et al.
2021/0144413 A1 5/2021 Lowry et al.
2022/0124225 A1* 4/2022 Gunji ..................... G03B 17/02
2022/0256081 A1 8/2022 Artonne

FOREIGN PATENT DOCUMENTS

CN 207099176 U * 3/2018
CN 213152158 U * 5/2021
CN 111983885 B * 9/2021 ............. G03B 17/55

OTHER PUBLICATIONS

Espacenet provided translation of CN-111983885-B (Year: 2021).*
Espacenet provided translation of CN-207099176-U (Year: 2018).*
Espacenet provided translation of CN-213152158-U (Year: 2021).*

* cited by examiner

*Primary Examiner* — Tyler W. Sullivan

(57) ABSTRACT

Provided is a panoramic camera. The panoramic camera includes a shell, camera mechanisms, a central control mechanism, a memory card, a heat dissipating support, heat dissipating mechanisms and a fan. A top end of the shell is provided with a first vent hole and a first card slot, the first card slot is located in a center of the top end of the shell, a bottom end of the shell is provided with a second vent hole, and the first vent hole is in communication with the second vent hole.

17 Claims, 26 Drawing Sheets

PANORAMIC CAMERA

CROSS-REFERENCE TO RELATED APPLICATIONS

This application is a continuation of International Patent Application No. PCT/CN2023/079386 with a filing date of Mar. 2, 2023, designating the United States, now pending, and further claims priority to Chinese Patent Application No. 202310034078.4 with a filing date of Jan. 10, 2023. The content of the aforementioned applications, including any intervening amendments thereto, is incorporated herein by reference.

TECHNICAL FIELD

The present disclosure relates to the field of camera apparatuses, and in particular to a panoramic camera.

BACKGROUND

A panoramic camera, a type of camera capable of independent wide-range surveillance without a blind angle, is capable of monitoring and covering a scene without a blind spot, thus achieving seamless monitoring and achieving a new monitoring application. It is applied to various fields, including a government agency, a bank, social security, a public place, a cultural place, etc.

The existing panoramic camera consists of a base and camera modules arranged around a top end of the base, and is used for photography and videography. Generally, it has to be equipped with a large-sized circuit board processor for processing a large amount of information. Heat is generated when a central control mechanism of the panoramic camera processes data, and needs to be transmitted in time. But most panoramic cameras are cooled only by mounting cooling aluminum shells, with a poor heat dissipation effect. As a result, after operated for a certain period of time, the panoramic cameras are prone to breakdown during operation because of high temperature, and become unusable.

So, it is necessary to provide a panoramic camera to solve the above technical problem.

SUMMARY OF PRESENT INVENTION

The present disclosure provides a panoramic camera to solve the problem of a poor heat dissipation effect of a panoramic camera in the prior art.

In order to solve the above technical problem, the technical solution of the present disclosure is described as below. A panoramic camera includes:

- a shell, where a top end of the shell is provided with a first vent hole and a first card slot, the first card slot is located in a center of the top end of the shell and extends into the shell, a bottom end of the shell is provided with a second vent hole, and the first vent hole is in communication with the second vent hole;
- camera mechanisms, where several camera mechanisms are arranged, the several camera mechanisms are arranged around a peripheral side of the shell, and the camera mechanisms are used for photographing pictures;
- a central control mechanism mounted in the shell, where the central control mechanism is connected to the camera mechanisms;

- a memory card, where a top end of the memory card is inserted into the first card slot, and a bottom end of the memory card is inserted into the central control mechanism;
- a heat dissipating support mounted in the shell, where the heat dissipating support is located above the central control mechanism, a first heat dissipating channel is arranged in a center of the heat dissipating support, and the memory card penetrates the first heat dissipating channel;
- heat dissipating mechanisms arranged between an outer side of the heat dissipating support and the camera mechanisms, where several heat dissipating mechanisms are arranged, the several heat dissipating mechanisms are arranged around the outer side of the heat dissipating support, and the several heat dissipating mechanisms are connected to the several camera mechanisms respectively; and
- a fan arranged inside the shell and located at a bottom end of the heat dissipating support, where the fan circulates air between the first vent hole and the second vent hole.

Compared with the prior art, the present disclosure has the beneficial effects that according to the panoramic camera of the present disclosure, vent holes are provided on an upper portion and a lower portion of the shell, and an inner bottom end of the shell matches the fan, such that air inside the shell circulates at a high speed to dissipate heat. The first heat dissipating channel is arranged in the center of the heat dissipating support such that the heat dissipating support can support the memory card, and moreover, it is convenient for wind circulating in the shell to dissipate heat of the memory card. The several heat dissipating mechanisms and the several camera mechanisms are connected one to one for heat dissipation. The panoramic camera has a compact overall structure, thereby making full use of space inside the shell and interconnection relations between various components, and achieving excellent heat dissipation in a compact camera structure.

BRIEF DESCRIPTION OF THE DRAWINGS

In order to more clearly illustrate the technical solutions in the examples of the present disclosure or in the prior art, the accompanying drawings required for the examples will be briefly introduced below. The accompanying drawings in the following description show merely accompanying drawings corresponding to some examples of the present disclosure.

REFERENCE NUMERALS

Figure 1:
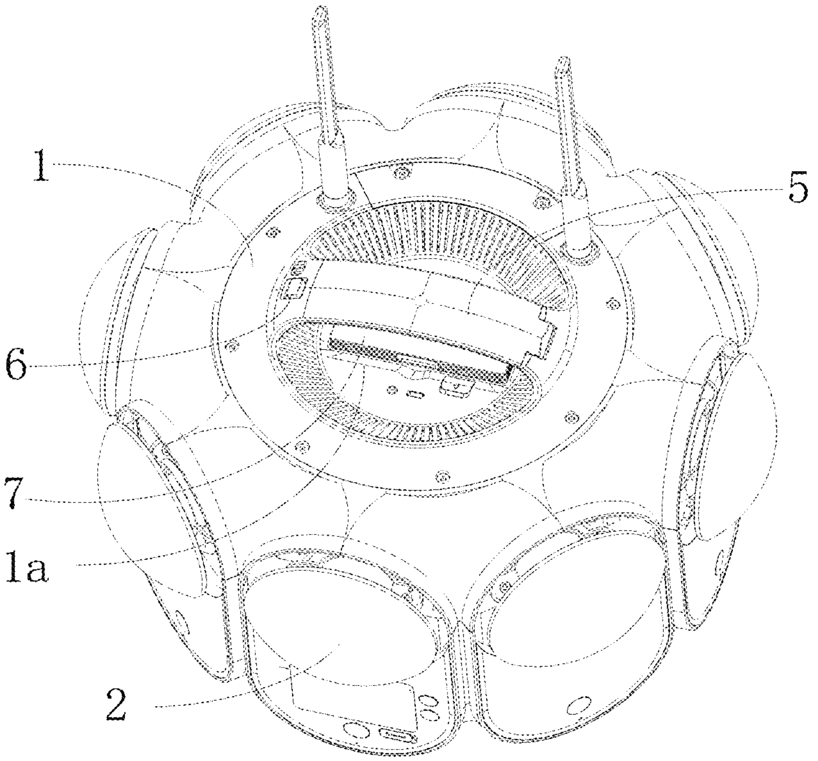
FIG. 1 is a schematic diagram of an overall structure of a panoramic camera according to a preferred example of the present disclosure.

1, shell; 1*a*, first card slot; 1*b*, first vent hole; 1*c*, second vent hole; 111, upper cover body; 1111, first inserting column; 112, lower housing; 1121, second inserting column; 1122, reinforcing strip; 12, lower supporting plate; 121, fan fixing groove; 13, upper supporting plate; 14, fixing frame; 141, connecting plate; 1411, first inserting hole; 1412, second inserting hole; 1413, camera mounting groove; 142, upper supporting column; 143, extending plate; 1431, first positioning groove; 144, lower supporting leg; 1441, inserting rod; 1442, mounting plate; 1443, fixing plate; 1444, positioning rod; 144*a*, first lower supporting leg; 1441*a*, first inserting rod; 1442*a*, first mounting plate; 1443*a*, first fixing plate; 1444*a*, first positioning rod; 144*b*, second lower supporting leg; 1441*b*, second inserting rod; 1442*b*, second mounting plate; 1443*b*, second fixing plate; 1444*b*, second positioning rod; 15, camera cover plate; 2, camera mechanism; 3, central control mechanism; 41, heat dissipating support; 411, supporting frame; 411*a*, first heat dissipating channel; 4111, first frame body; 4112, first supporting plate; 4113, first guiding plate; 4114, first connecting column; 4115, first wind guiding plate; 412, guiding frame; 412*a*, second heat dissipating channel; 4121, second frame body; 4121*a*, first through groove; 4122, second supporting plate; 4122*a*, second through groove; 4123, second guiding plate; 4123*a*, third through groove; 4123*b*, extending portion; 4123*c*, guiding portion; 4124, baffle; 422, heat dissipating fin; 42, heat dissipating mechanism; 421, heat dissipating plate; 4211, first heat dissipating groove; 422, heat dissipating fin; 4221, first through hole; 4222, supporting plate; 4223, second through hole; 4224, first separator plate; 423, heat pipe; 4231, first end portion; 4232, connecting portion; 4233, second end portion; 424, heat dissipating sheet; 425, heat dissipating patch; 43, fan; 5, handle; 5*a*, second card slot; 5*b*, positioning groove; 6, clamping mechanism; 61, first fixing seat; 61*a*, first adjusting hole; 61*b*, second adjusting hole; 611, positioning protrusion; 62, positioning plate; 62*a*, first limiting groove; 621, inserting portion; 622, connecting portion; 6221, first positioning column; 623, first pressing portion; 63, first elastic member; 64, limiting plate; 641, second pressing portion; 64*a*, second limiting groove; 64*b*, third limiting groove; 65, second elastic member; 66, connecting block; 7, memory card; 71, card body; 711, connector; 7111, third end portion; 7112, fourth end portion; 72, first housing; 721, second fixing seat; 7211, connecting hole; 7212, fourth vent hole; 7213, first inserting groove; 7214, second separator plate; 7215, third guiding plate; 7216, third inserting groove; 722, inserting cylinder; 7221, second heat dissipating groove; 7222, first inserting protrusion; 7223, second inserting protrusion; 7224, third supporting plate; 7225, fourth supporting plate; 723, cap; 7231, second inserting groove; 7232, pressing groove; and 724, chamfer.

DETAILED DESCRIPTION OF THE EMBODIMENTS

The technical solutions in the examples of the present disclosure will be clearly and completely described below in combination with the accompanying drawings in the examples of the present disclosure. Apparently, the examples described are only some examples rather than all examples of the present disclosure. All other examples obtained by those skilled in the art based on the examples in the present disclosure without making creative efforts shall fall within the scope of protection of the present disclosure.

In the accompanying drawings, structurally similar units are represented by the same reference numerals.

The terms "first", "second", etc. of the present disclosure are merely for descriptive purposes, cannot be understood as indicating or implying relative importance, and are not used as limitations of the sequence.

Figure 2:
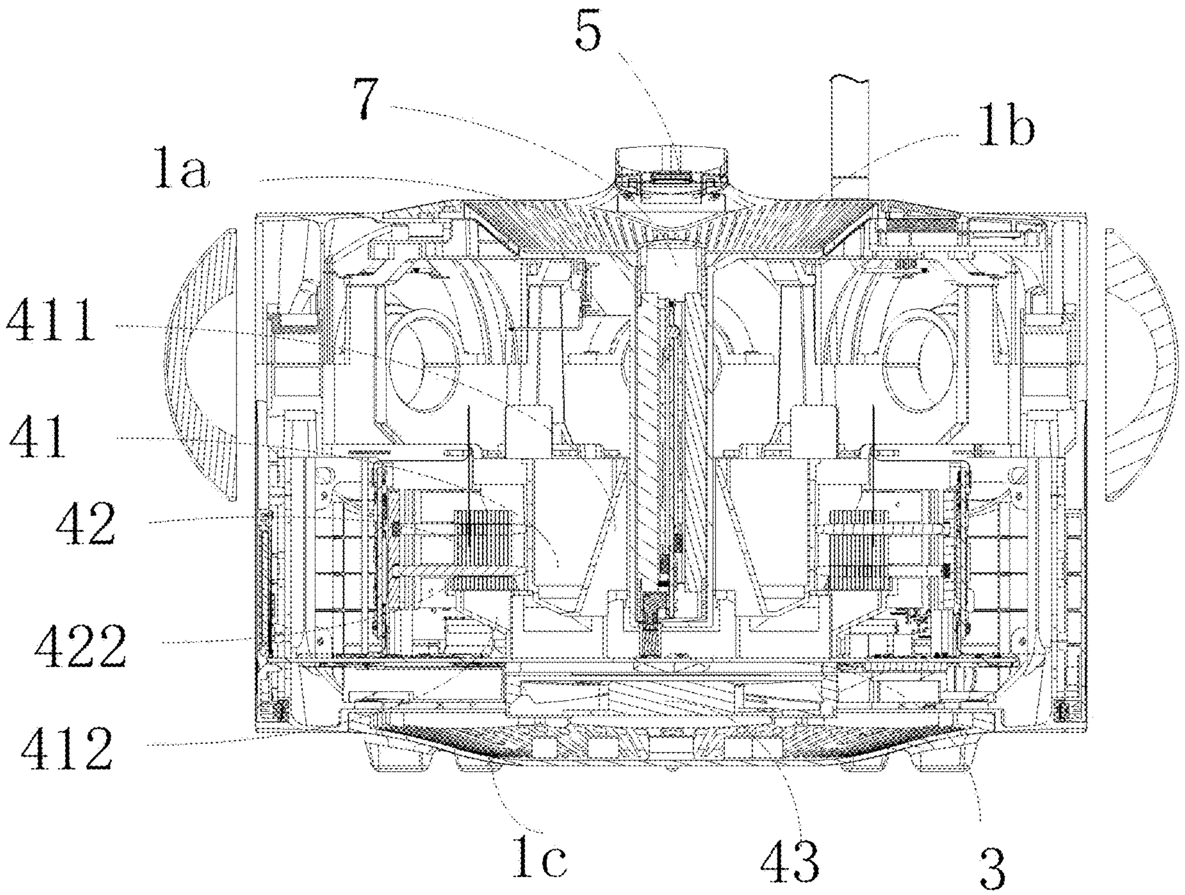
FIG. 2 is a sectional view of a panoramic camera according to a preferred example of the present disclosure.
Figure 3:
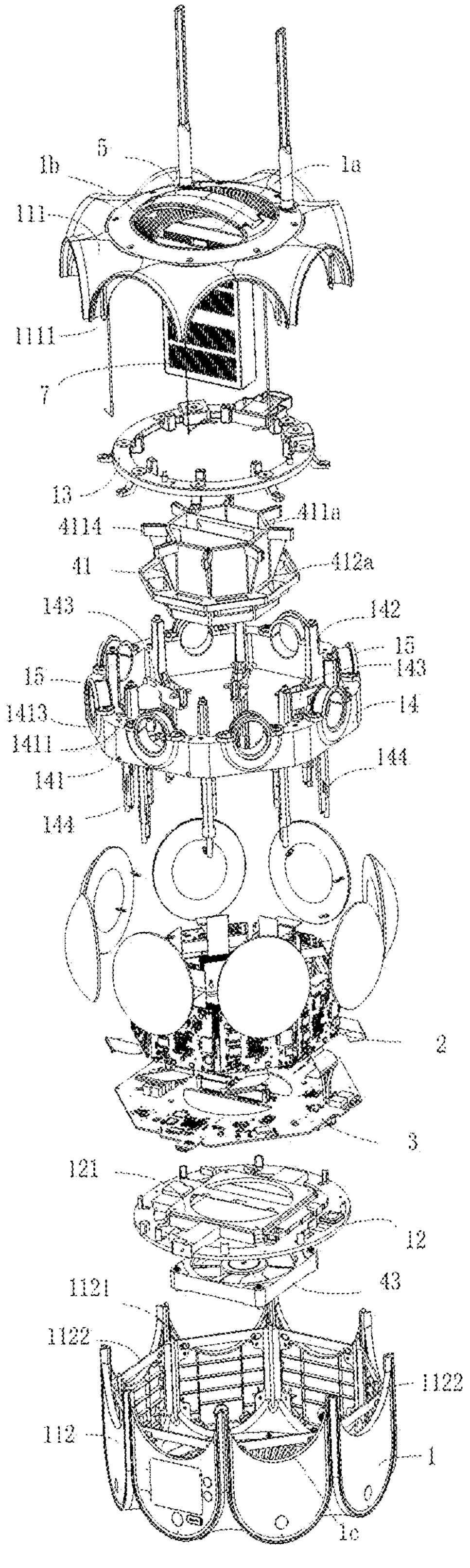
FIG. 3 is a structural exploded view of a panoramic camera according to a preferred example of the present disclosure.
Figure 4:
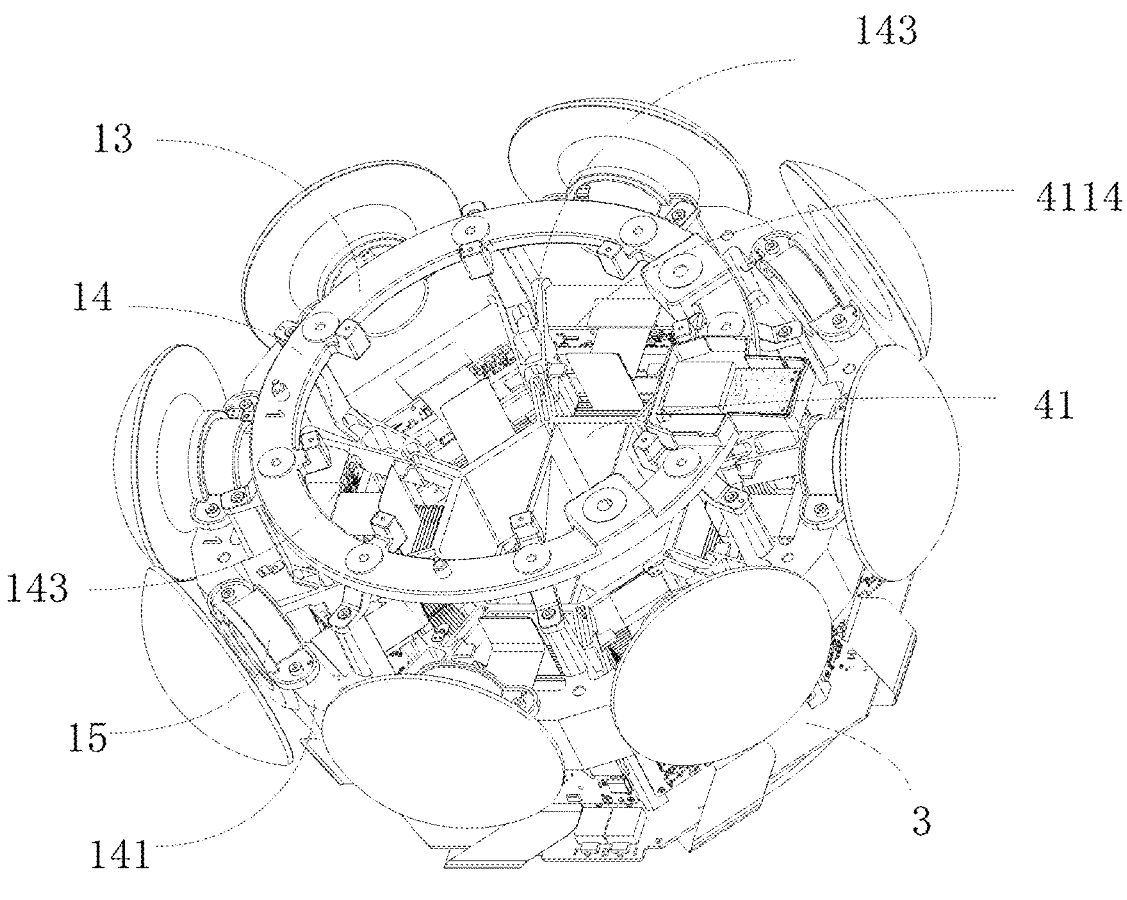
FIG. 4 is a diagram showing a state of use of a heat dissipating support according to a preferred example of the present disclosure.

With reference to FIGS. 1, 2 and 3, FIG. 1 is a schematic diagram of an overall structure of a panoramic camera according to a preferred example of the present disclosure, FIG. 2 is a sectional view of a panoramic camera according to a preferred example of the present disclosure, and FIG. 3 is a structural exploded view of a panoramic camera according to a preferred example of the present disclosure.

The following is a preferred example of a panoramic camera capable of solving the above technical problem according to the present disclosure.

The preferred example of the panoramic camera according to the present disclosure is as follows: a panoramic camera includes a shell 1, camera mechanisms 2, a central control mechanism 3, a memory card 7 and a heat dissipating structure. A top end of the shell 1 is provided with a first vent hole 1*b*, a bottom end of the shell 1 is provided with a second vent hole 1*c*, the first vent hole 1*b* is in communication with the second vent hole 1*c*, the camera mechanisms 2 are connected to the shell 1, the several camera mechanisms 2 are arranged around a peripheral side of the shell 1, and the camera mechanisms 2 are used for photographing pictures. The central control mechanism 3 is arranged inside the shell 1, the central control mechanism 3 is connected to the several camera mechanisms, and the top end of the shell 1 is provided with a first card slot 1*a*. The first card slot 1*a* extends into the shell 1, a side wall of a top end of the memory card 7 is inserted into the first card slot 1*a*, and a bottom end of the memory card 7 is inserted into the central control mechanism 3.

The heat dissipating structure in the example includes a heat dissipating support 41, heat dissipating mechanisms 42 and a fan 43. The heat dissipating mechanisms 42 are connected to an outer side of the heat dissipating support 41, several heat dissipating mechanisms 42 are arranged, the several heat dissipating mechanisms 42 are arranged around the outer side of the heat dissipating support 41, and the several heat dissipating mechanisms 42 are connected to the several camera mechanisms 2 respectively. The fan 43 is arranged inside the shell 1 and located at a bottom end of the heat dissipating support 41, and the fan 43 conveys air inside the shell 1. The fan 43 circulates air between the first vent hole 1*b* and the second vent hole 1*c*, and the air inside the shell 1 circulates at a high speed to dissipate heat. A first heat dissipating channel 411*a* is arranged in a center of the heat dissipating support 41 such that the heat dissipating support 41 can support the memory card 7, and moreover, it is convenient for wind circulating inside the shell 1 to dissipate heat of the memory card 7. Through the several heat dissipating mechanisms 42, the several camera mechanisms 2 on an outer side of the shell 1 correspond one to one for heat dissipation. The panoramic camera has a compact overall structure, thereby making full use of space inside the shell 1 and interconnection relations between various components, and achieving excellent heat dissipation in a compact camera structure.

In combination with FIGS. 5-8, the heat dissipating mechanism 42 in the example is explained in detail as follows:

in the example, the heat dissipating mechanism 42 includes a heat dissipating plate 421, a heat dissipating fin 422 and a heat pipe 423. The heat dissipating plate 421 is connected to a camera mechanism 2. The heat dissipating fin 422 is connected to an outer wall of a heat dissipating support 41. The heat pipe 423 connects a heat dissipating sheet 424 to an outer side of the heat dissipating support 41, and the heat pipe 423 penetrates the heat dissipating fin 422.

The heat dissipating mechanism 42 in the example dissipates heat of a configuration area of a memory card 7 by arranging a first heat dissipating channel 411*a* in the heat dissipating support 41. The heat dissipating mechanism 42 dissipates heat of the camera mechanism 2 on an outer side of a shell 1, and an overall structure is compact. The heat dissipating mechanism 42 is connected to the camera mechanism 2 through the heat dissipating plate 421 for heat conduction and heat dissipation. The heat pipe 423 conducts heat on the heat dissipating plate 421 to the heat dissipating fin 422, and the heat pipe 423 is inserted into the heat dissipating fin 422 in a penetrating manner to improve heat dissipation efficiency of the heat dissipating mechanism 42. Moreover, the heat dissipating fin 422 improves a heat dissipation effect of the heat dissipating support 41 on the memory card 7, and has high practicality.

In the example, a first heat dissipating groove 4211 is provided on one side of the heat dissipating plate 421 close to the heat dissipating support 41, and one end of the heat pipe 423 is clamped to the heat dissipating plate 421. The first heat dissipating groove 4211 increases a heat dissipation area of the heat dissipating plate 421, thereby improving a heat dissipation effect of the heat dissipating structure.

Figure 8:
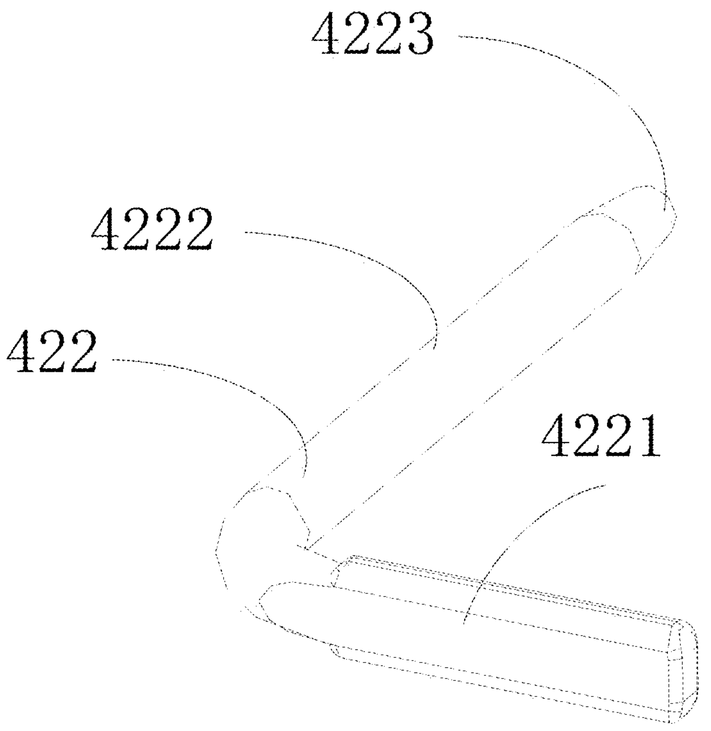
FIG. 8 is a schematic structural diagram of a heat pipe according to a preferred example of the present disclosure.

As shown in FIG. 8, a heat pipe 423 includes a first end portion 4231, a second end portion 4233 and a connecting portion 4232. The first end portion 4231 is clamped to a first heat dissipating groove 4211, and a straight line in which a long edge of the first end portion 4231 is located is parallel to a plane in which a heat dissipating plate 421 is located. The second end portion 4233 is connected to a heat dissipating support 41, and a straight line in which a long edge of the second end portion 4233 is located intersects with the straight line in which the long edge of the first end portion 4231 is located. The connecting portion 4232 is arranged in a middle of the heat pipe 423, and the connecting portion 4232 connects the first end portion 4231 to the second end portion 4233. The first end portion 4231 has a width greater than a width of the second end portion 4233. The first end portion 4231 of the heat pipe 423 in the example is of a flat structure, thereby increasing a heat dissipation area of the heat pipe 423, and improving a heat dissipation effect of the heat dissipating structure.

In the example, the heat dissipating fin 422 is provided with a first through hole 4221, and the heat pipe 423 penetrates the first through hole 4221. A supporting plate 4222 is arranged on a side edge of the heat dissipating fin 422, the supporting plate 4222 is located at a bottom of one side of the first through hole 4221, and the supporting plate 4222 is used for supporting the heat pipe 423. The first through hole 4221 supports the heat pipe 423, thereby increasing a contact surface between the heat pipe 423 and the heat dissipating fin 422, and further improving the heat dissipation effect of the heat dissipating structure.

Further, one end of the second end portion 4233 of the heat pipe 423 away from the connecting portion 4232 has a width gradually reduced, thereby conveniently inserting the heat pipe 423 and the heat dissipating fin 422 in a penetrating manner.

The heat dissipating fin 422 is further provided with a second through hole 4223, the second through hole 4223 is in communication with the first through hole 4221, and the first through hole 4221 has a diameter greater than a diameter of the second through hole 4223. The heat dissipating fin 422 is provided with the second through hole 4223, and the second through hole 4223 improves mobility of air between the heat dissipating fins 422, and improves heat dissipation performance of the heat dissipating fin 422.

Further, several heat dissipating fins 422 are arranged in the example, and a straight line in which an arrangement direction of the several heat dissipating fins 422 is located is perpendicular to a plane in which an outer side wall of the heat dissipating support 41 is located. The several heat dissipating fins 422 are arranged, such that a heat dissipation effect of the heat dissipating mechanism 42 on the heat pipe 423 and an overall structure of the panoramic camera can be improved.

Moreover, a first separator plate 4224 is arranged on one side of the heat dissipating fin 422 in the example, and the first separator plate 4224 is used for separating adjacent heat dissipating fins 422. The first separator plate 4224 increases a heat dissipation area of the heat dissipating fin 422, and conveniently circulates air between two adjacent heat dissipating fins 422, thereby improving the heat dissipation effect of the heat dissipating fin.

In the example, two heat pipes 423 are arranged, and the two heat pipes 423 are centrosymmetric with respect to a center of the heat dissipating fin 422 by taking a plane in which the heat dissipating fin 422 is located as a reference. A heat conduction area of the heat pipe 423 to the heat dissipating plate 421 is increased, thereby improving the heat dissipation effect of the heat dissipating plate 421 on the camera mechanism 2.

Figure 5:
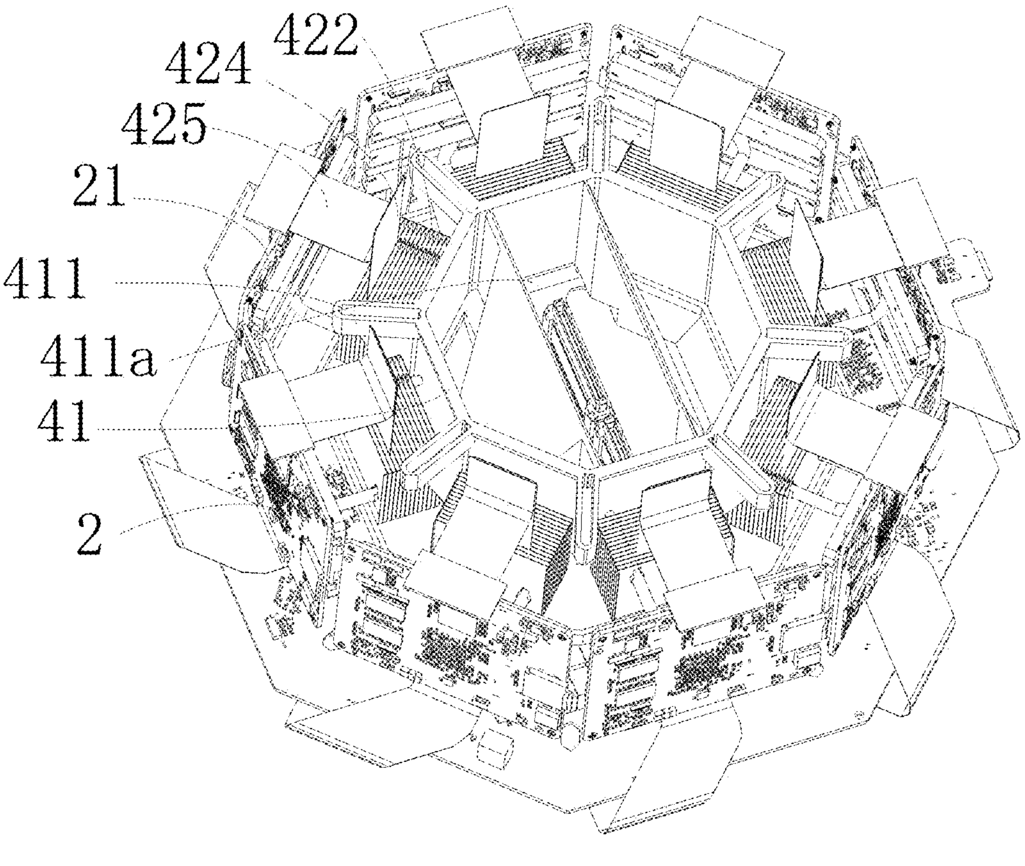
FIG. 5 is a diagram showing a state of use of a heat dissipating mechanism according to a preferred example of the present disclosure.
Figure 6:
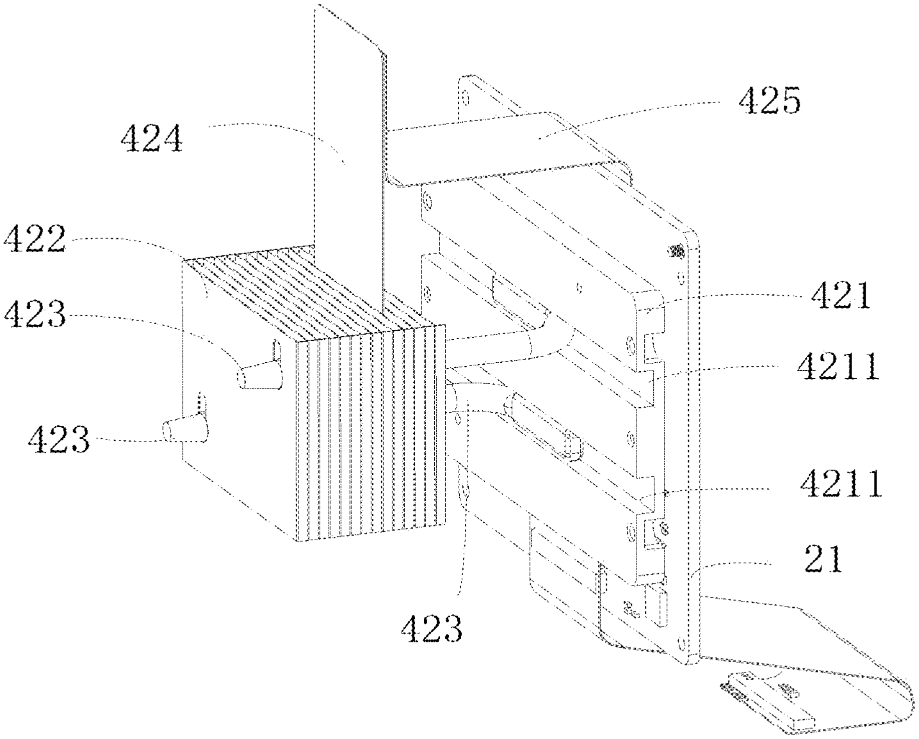
FIG. 6 is a schematic diagram of a heat dissipating mechanism according to a preferred example of the present disclosure.
Figure 7:
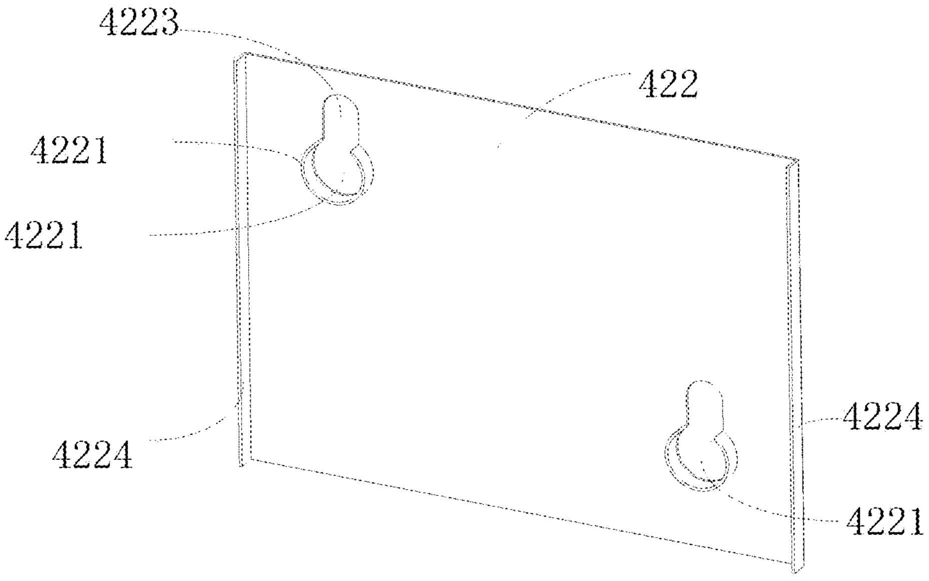
FIG. 7 is a structural diagram of a heat dissipating fin according to a preferred example of the present disclosure.

As shown in FIG. 5, the panoramic camera in the example further includes a heat dissipating sheet 424 and a heat dissipating patch 425. The heat dissipating sheet 424 is connected to a side edge of the heat dissipating fin 422, and a plane in which the heat dissipating sheet 424 is located is parallel to a plane in which the heat dissipating fin 422 is located. One end of the heat dissipating patch 425 is connected to the other side of the camera mechanism 2, and the other end of the heat dissipating patch 425 is connected to a side surface of the heat dissipating sheet 424. The heat dissipating structure conducts heat on two sides of the camera mechanism 2 for cooling, thereby improving heat dissipation efficiency of the heat dissipating structure on the camera mechanism 2.

The several camera mechanisms 2 and the several heat dissipating mechanisms 42 are arranged in the example, and the several camera mechanisms 2 correspond to the several heat dissipating mechanisms 42 one to one. The single camera mechanism 2 is connected to the outer side of the heat dissipating support 41 through the single heat dissipating mechanism 42, thereby improving uniform heat dissipation of the overall structure of the panoramic camera.

In combination with FIGS. 2, 3 and 9-11, a structure of the heat dissipating support 41 in the example is explained as follows:

- a first heat dissipating channel 411*a* for mounting a memory card 7 is arranged in a center of a heat dissipating support 41 in the example, and heat of a structure of the memory card is dissipated in the center of the heat dissipating support 41. In the example, the heat dissipating support 41 includes a supporting frame 411. The supporting frame 411 is of a polygonal structure. The heat dissipating support 41 improves circulation of air inside the panoramic camera.

The heat dissipating support 41 is arranged inside a shell 1, and a first heat dissipating channel 411*a* is arranged inside the heat dissipating support 41, and the first heat dissipating channel 411*a* is in communication with a first card slot 1*a*. Moreover, the first heat dissipating channel 411*a* is inserted into the memory card 7. A fan 43 is located at a bottom end of the heat dissipating support 41 and is connected to an inner bottom end of the shell 1, and the fan 43 circulates air between a first vent hole 1*b* and a second vent hole 1*c*. A central control mechanism 3 is arranged in the shell 1, the central control mechanism 3 is located between the fan 43 and the heat dissipating support 41, the central control mechanism 3 is connected to the fan 43, and the central control mechanism 3 supplies power to the fan 43.

In the example, vent holes are provided on an upper portion and a lower portion of the shell 1, and an inner bottom end of the shell 1 matches the fan 43, such that air inside the shell 1 circulates at a high speed to dissipate heat. The first heat dissipating channel 411*a* is arranged in the center of the heat dissipating support 41 such that the heat dissipating support 41 can support the memory card 7, and moreover, it is convenient for wind circulating in the shell 1 to dissipate heat of the memory card 7. Several second heat dissipating channels 412*a* are arranged around a peripheral side of the heat dissipating support 41. The several second heat dissipating channels 412*a* are arranged on the peripheral side of the heat dissipating support 41, such that wind circulated by the fan 43 can be guided towards the peripheral side. Thus, the camera mechanism 2 arranged on the peripheral side of the shell 1 can be ventilated for heat dissipation, thereby improving practicability of a ventilating structure, and improving a heat dissipation effect of the panoramic camera.

As shown in FIG. 3, a third vent hole is provided in a center of a central control mechanism 3, and the third vent hole is in communication with a first vent hole 1*b* and a second vent hole 1*c*. In combination with FIG. 3, a heat dissipating support 41 includes a supporting frame 411 and a guiding frame 412. The supporting frame 411 is connected to an inner wall of a shell 1, and a first heat dissipating channel 411*a* is located in a center of the supporting frame 411. Thus, the heat dissipating support 41 may support a memory card 7, and moreover, it is convenient for wind circulating in a shell 1 to dissipate heat of the memory card 7. The guiding frame 412 is connected to a bottom end of the supporting frame 411, several second heat dissipating channels 412*a* are arranged around a peripheral side of the guiding frame 412, and the several second heat dissipating channels 412*a* are in communication with the third vent hole. By arranging the several second heat dissipating channels 412*a* on the peripheral side of the guiding frame 412, the heat dissipating support 41 can guide the wind circulated by the fan 43 towards the peripheral side. Thus, a camera mechanism 2 arranged on a peripheral side of the shell 1 can be ventilated for heat dissipation, and practicality of a ventilating structure can be improved.

In the example, the supporting frame 411 includes a first frame body 4111, first supporting plates 4112 and a first guiding plate 4113. A first connecting column 4114 connected to an inner wall of the shell 1 is arranged on an outer side of the first frame body 4111, and a bottom end of the first frame body 4111 is connected to an inner ring of the guiding frame 412. Two first supporting plates 4112 are arranged, the two first supporting plates 4112 are oppositely arranged on two sides of an interior of the first frame body 4111, and a first heat dissipating channel 411*a* is formed between the two first supporting plates 4112. The first guiding plate 4113 is arranged at a bottom end of the supporting frame 411, the first guiding plate 4113 connects the first frame body 4111 to the first supporting plate 4112, and the first guiding plate 4113 guides air from a second heat dissipating channel 412*a* to a third vent hole.

Wind guiding surfaces are oppositely arranged between the two first supporting plates 4112, and a distance between one ends of the two wind guiding surfaces close to a fan 43 is gradually increased. Thus, it is convenient to guide wind circulated by the fan 43 into the memory card 7, thereby improving heat dissipation efficiency of the ventilating structure.

Further, the supporting frame 411 is of a polygonal structure, an inner ring structure of the guiding frame 412 matches a bottom end structure of the supporting frame 411, and a bottom end of the supporting frame 411 is inserted into an inner ring of the guiding frame 412. The supporting frame 411 and the guiding frame 412 are of an inserting structure, such that assembly is convenient. Moreover, the bottom end of the supporting frame 411 is inserted into the inner ring of the guiding frame 412, thereby improving stability of an internal structure of the shell 1.

Figure 9:
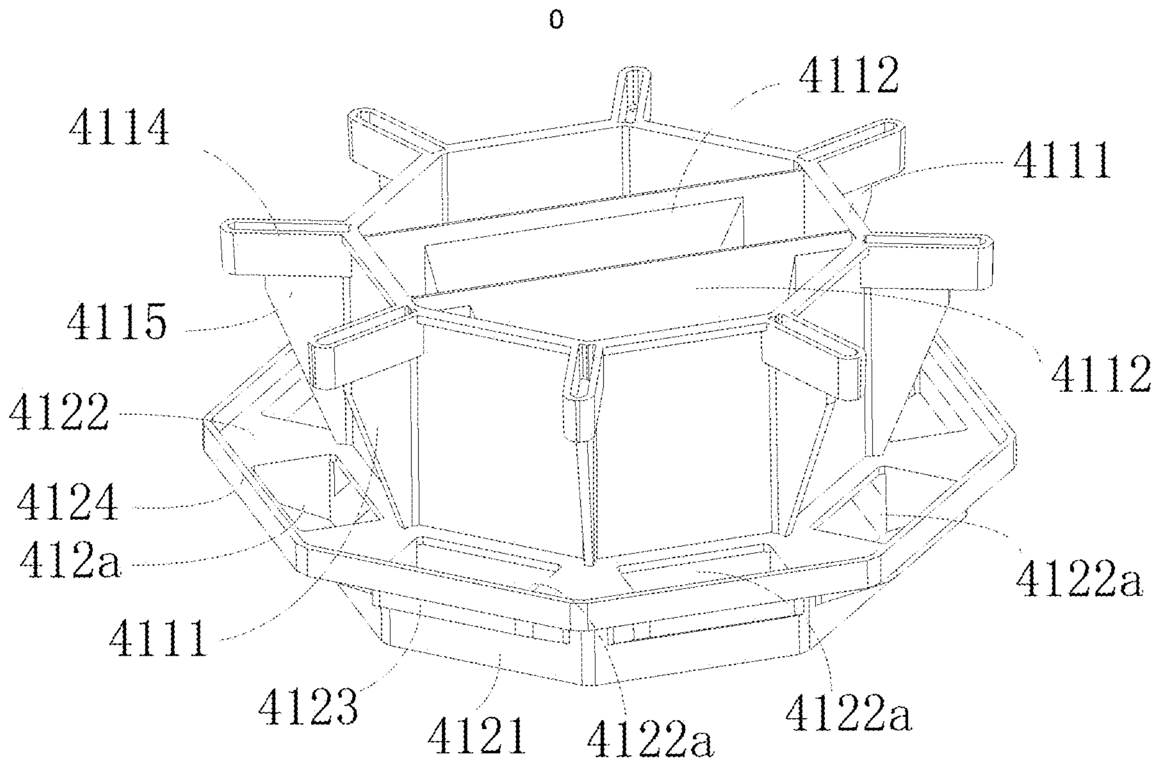
FIG. 9 is a perspective view of a heat dissipating support according to a preferred example of the present disclosure.
Figure 10:
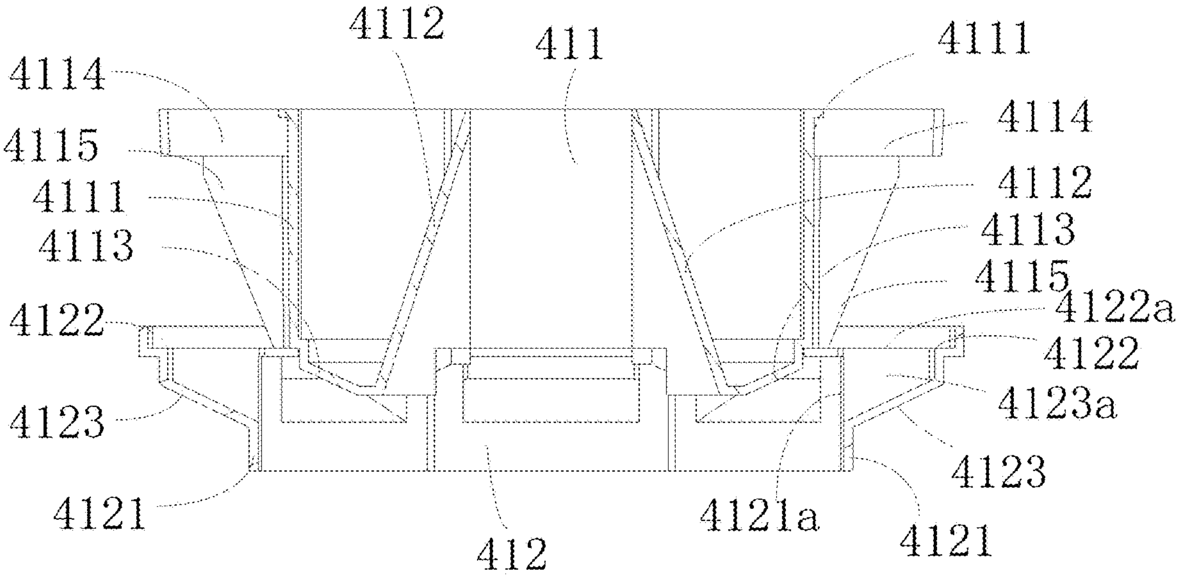
FIG. 10 is a sectional view of a heat dissipating support according to a preferred example of the present disclosure.
Figure 11:
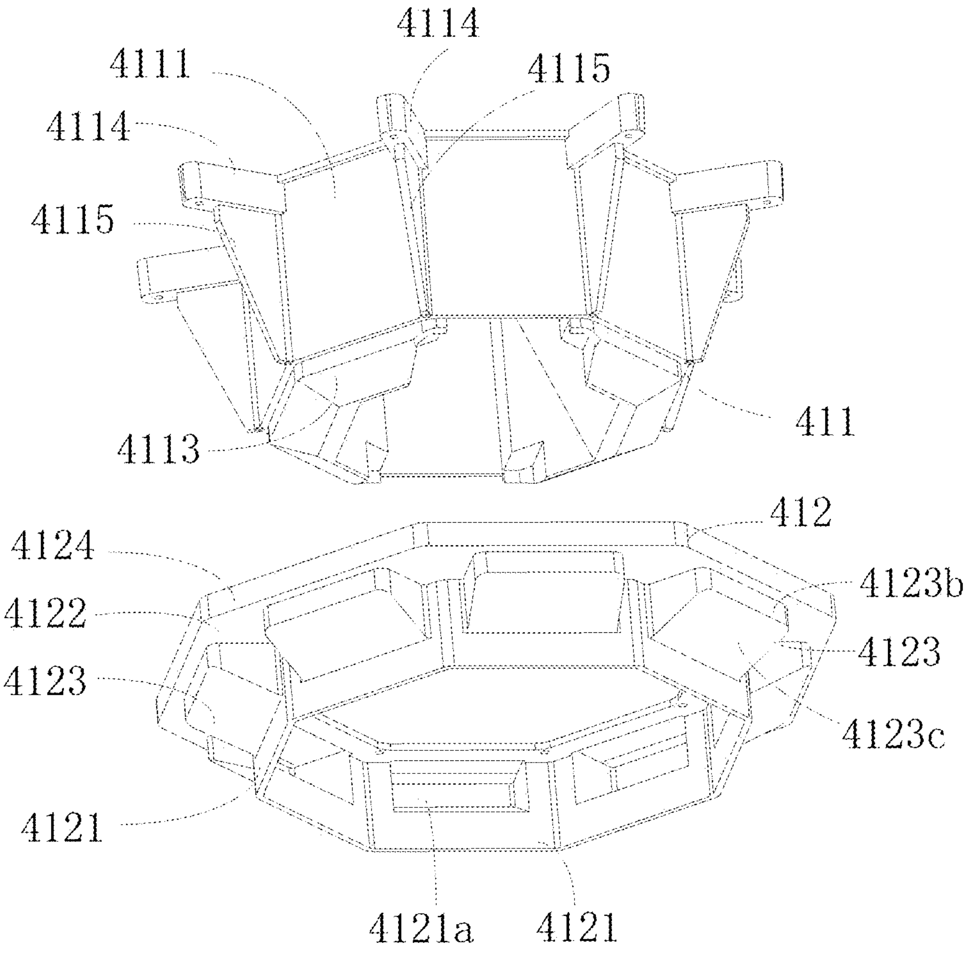
FIG. 11 is a diagram showing a state of use of a supporting structure according to a preferred example of the present disclosure.
Figure 12:
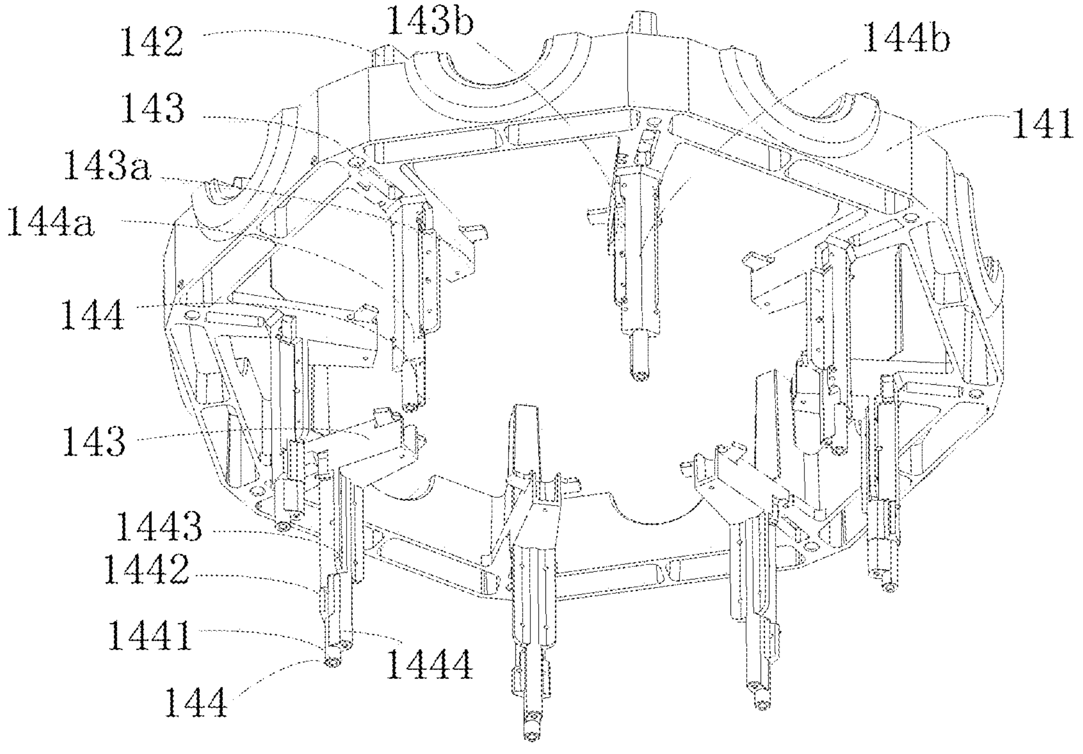
FIG. 12 is a perspective view of a fixing frame according to a preferred example of the present disclosure.
Figure 13:
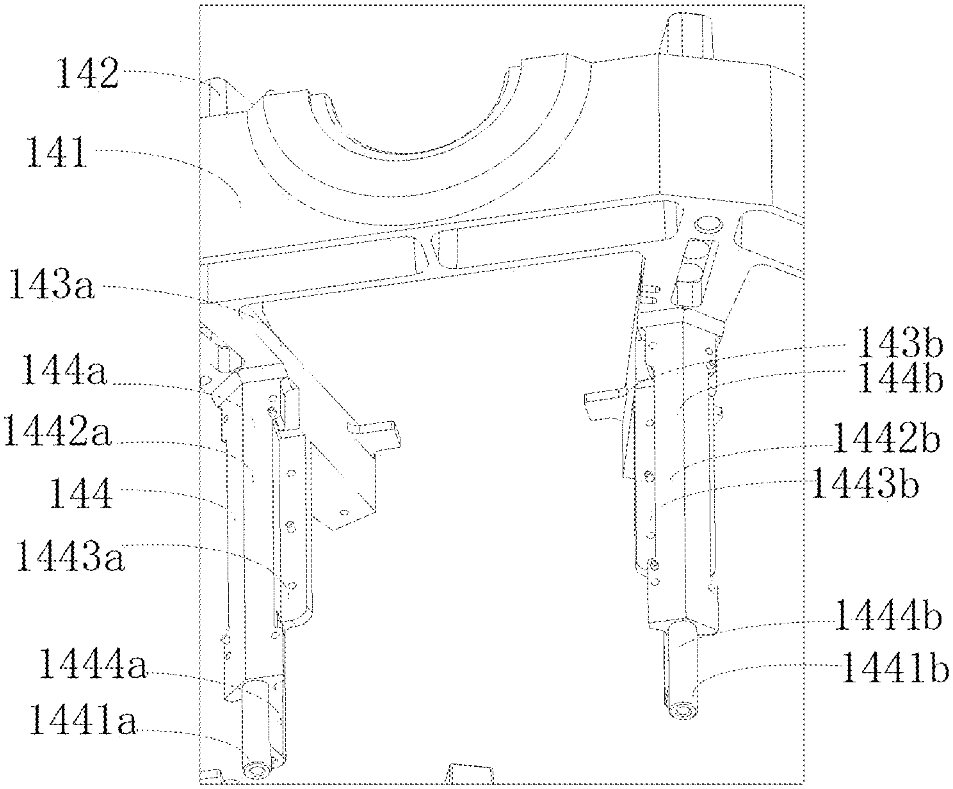
FIG. 13 is a schematic diagram of a local structure of a fixing frame according to a preferred example of the present disclosure.
Figure 14:
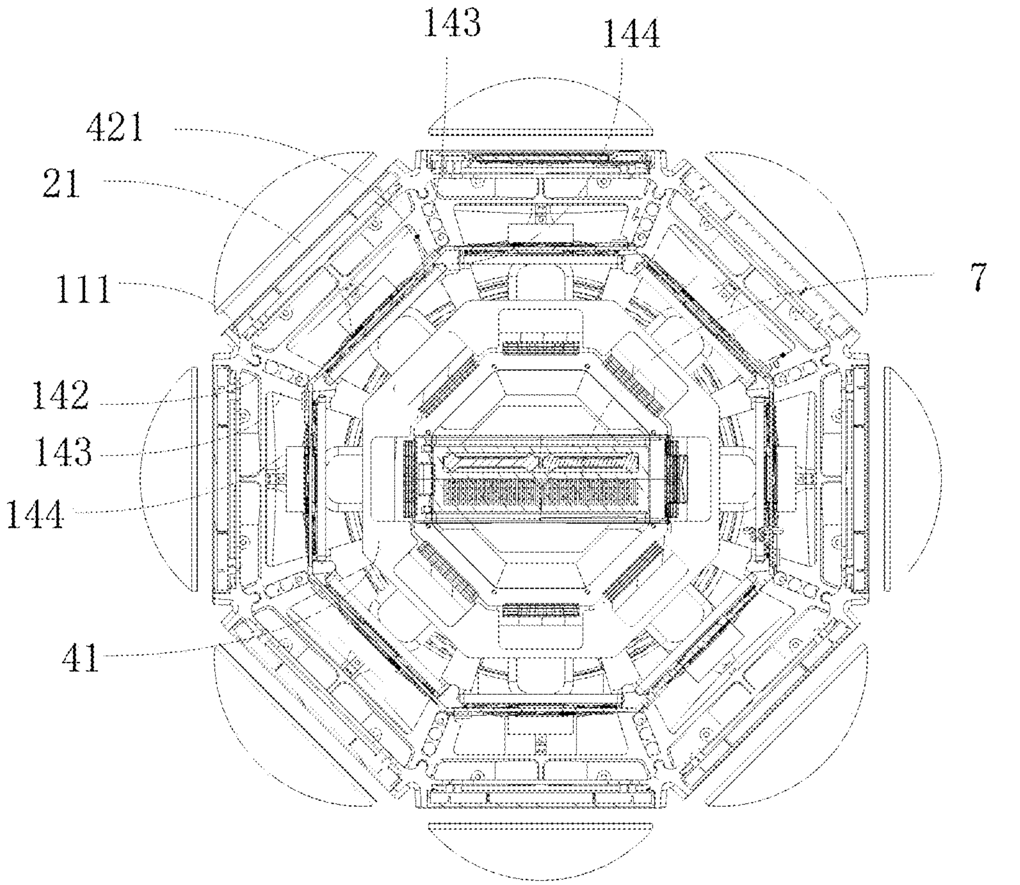
FIG. 14 is a first sectional view of a panoramic camera according to a preferred example of the present disclosure.
Figure 15:
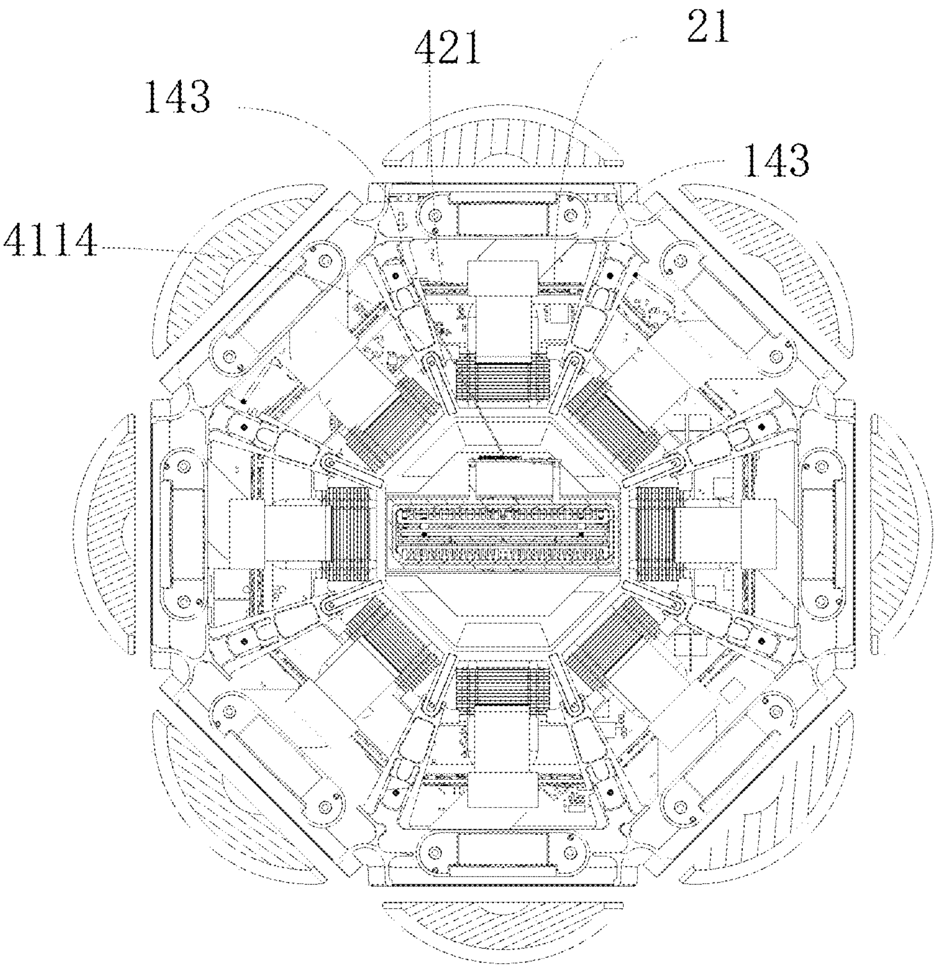
FIG. 15 is a second sectional view of a panoramic camera according to a preferred example of the present disclosure.
Figure 16:
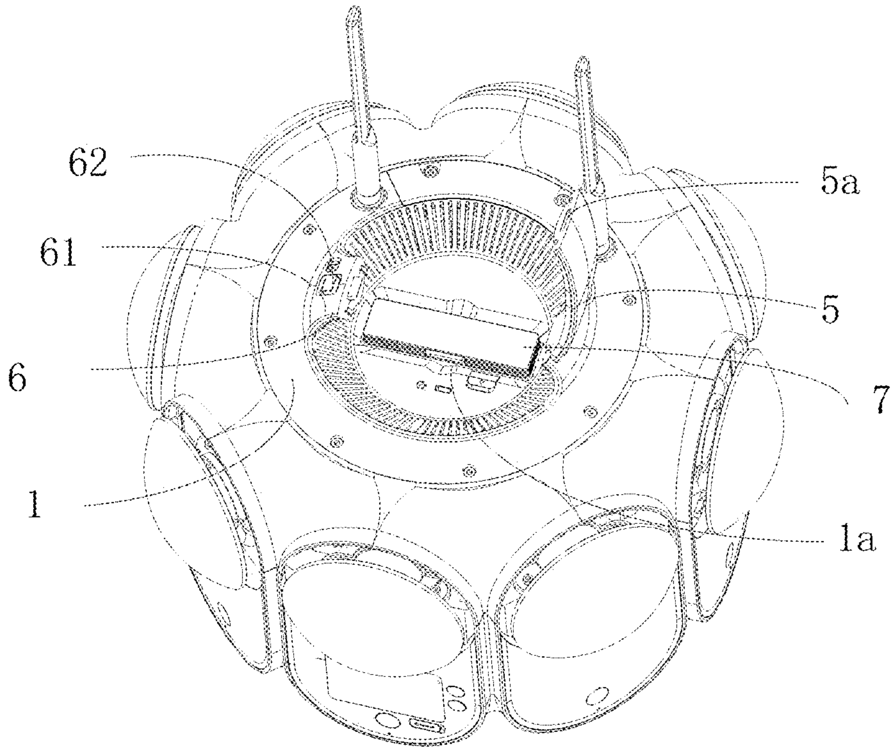
FIG. 16 is a second perspective view according to a preferred example of the present disclosure.
Figure 17:
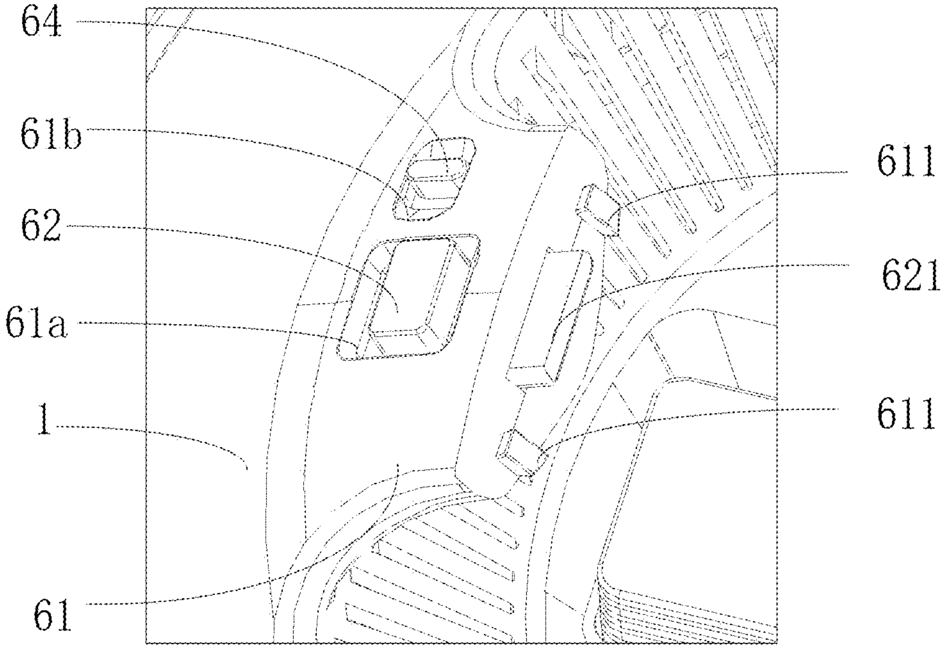
FIG. 17 is a perspective view of a clamping mechanism according to a preferred example of the present disclosure.
Figure 18:
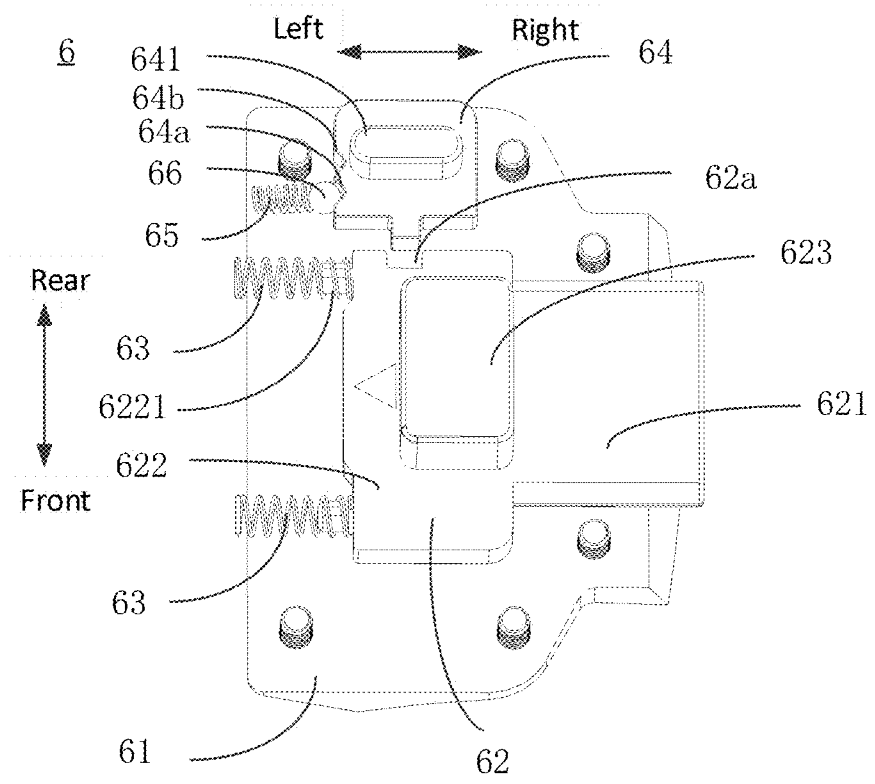
FIG. 18 is a first schematic diagram of a clamping mechanism according to a preferred example of the present disclosure.
Figure 19:
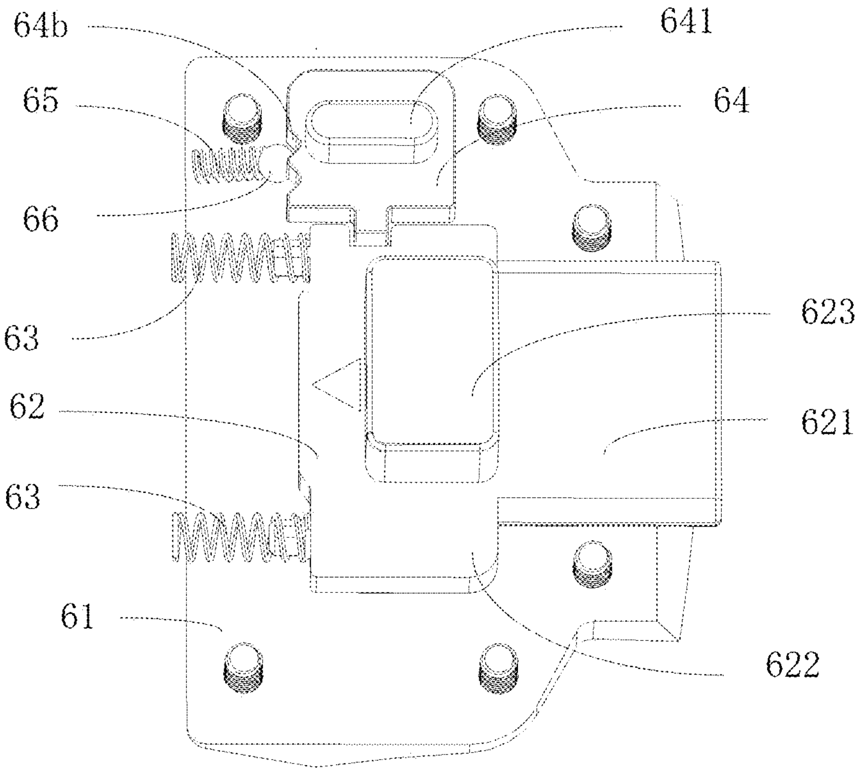
FIG. 19 is a second schematic diagram of a clamping mechanism according to a preferred example of the present disclosure.
Figure 20:
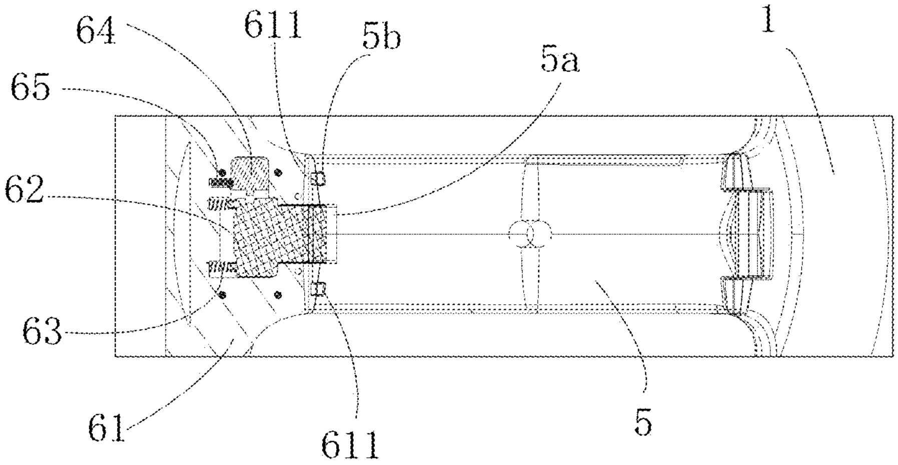
FIG. 20 is a sectional view of a joint between a clamping mechanism and a handle according to a preferred example of the present disclosure.
Figure 21:
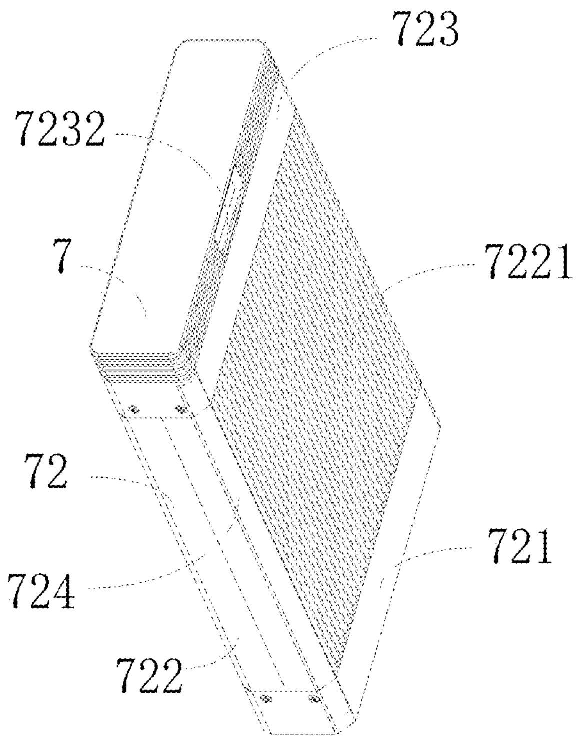
FIG. 21 is a first structural perspective view of a memory card according to a preferred example of the present disclosure.
Figure 22:
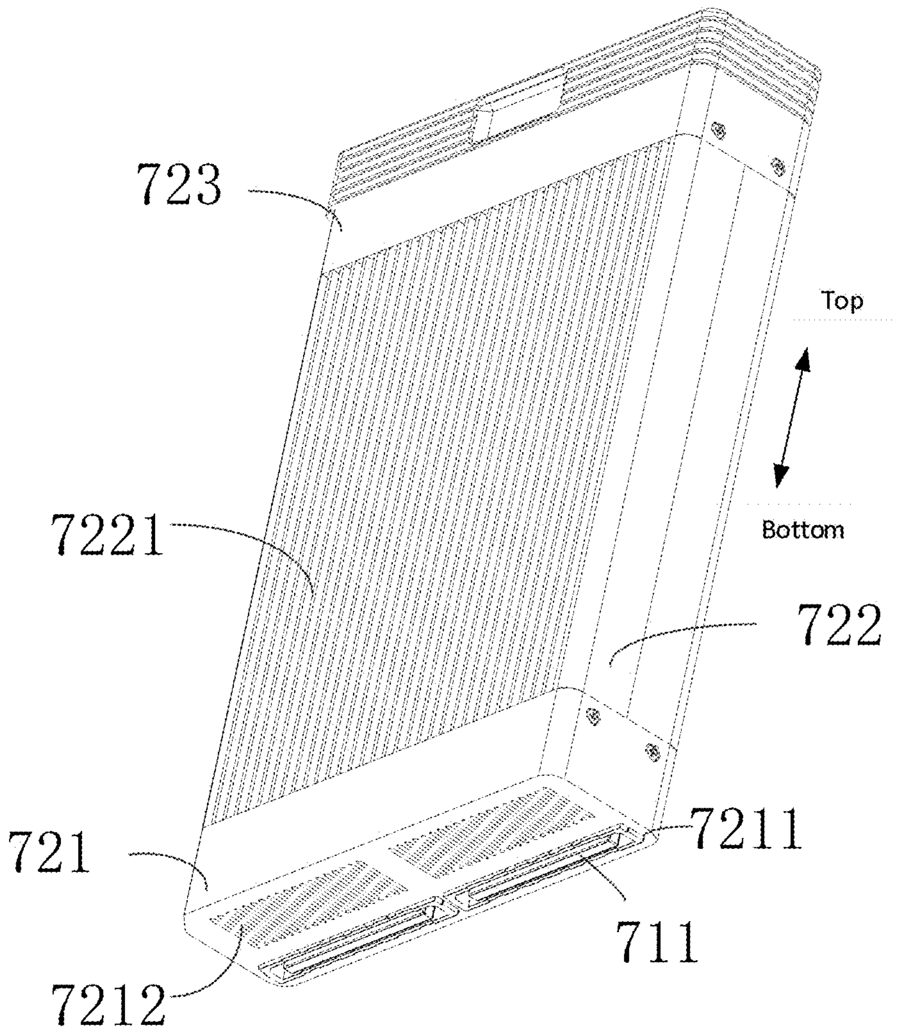
FIG. 22 is a second structural perspective view of a memory card according to a preferred example of the present disclosure.
Figure 23:
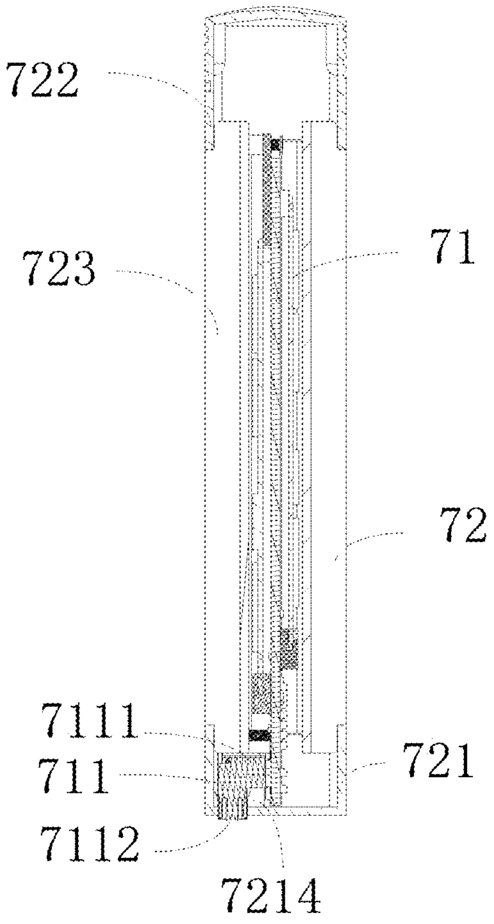
FIG. 23 is a first structural sectional view of a memory card according to a preferred example of the present disclosure.
Figure 24:
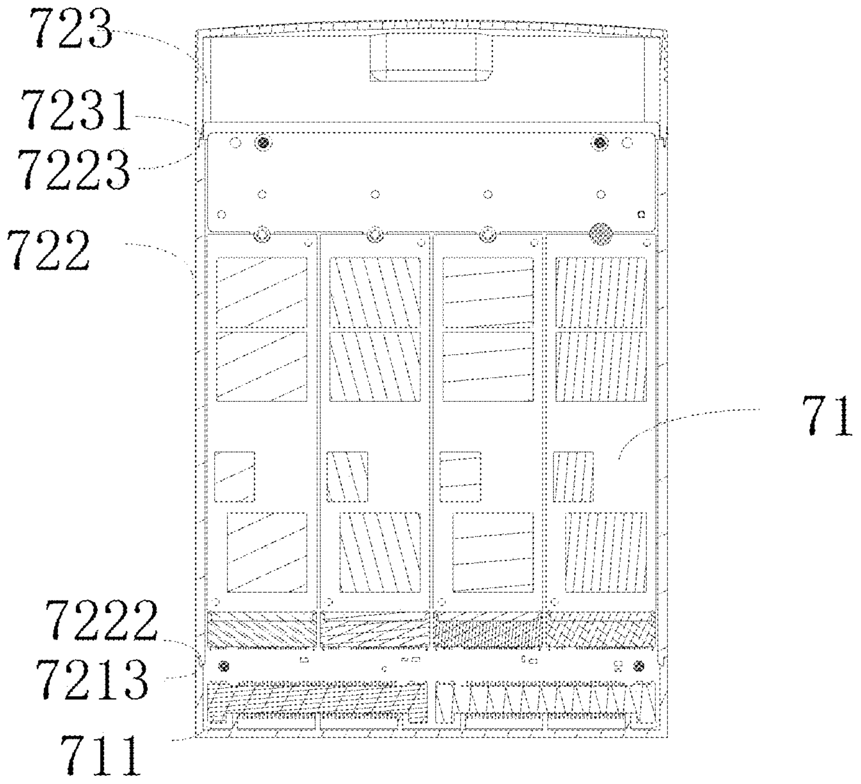
FIG. 24 is a second structural sectional view of a memory card according to a preferred example of the present disclosure.
Figure 25:
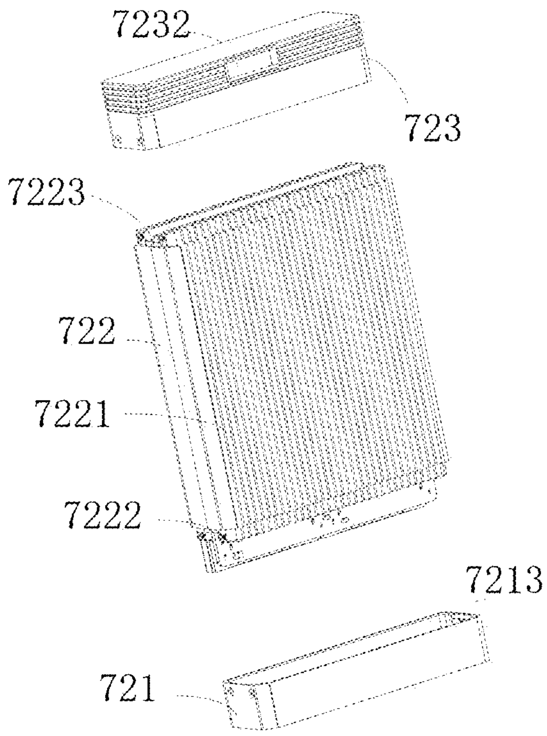
FIG. 25 is a first structural exploded view of a memory card according to a preferred example of the present disclosure.
Figure 26:
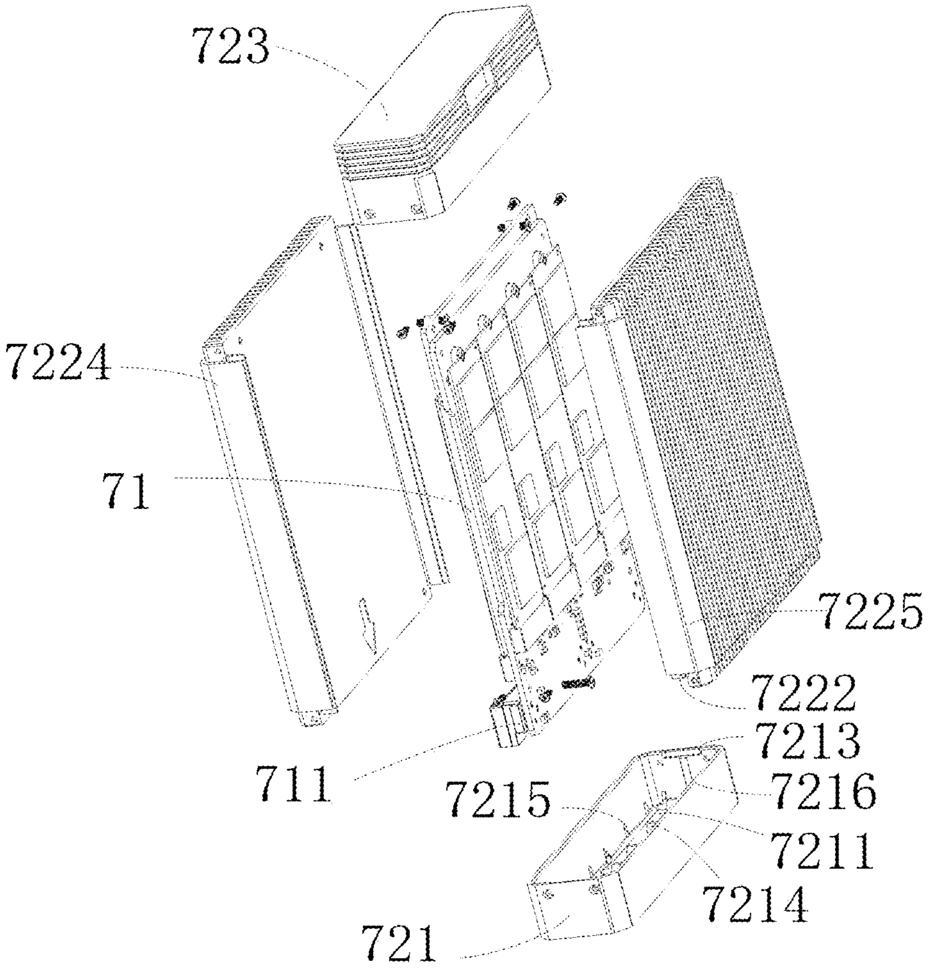
FIG. 26 is a second structural exploded view of a memory card according to a preferred example of the present disclosure.

In combination with FIGS. 9-11, in the example, the guiding frame 412 includes a second frame body 4121, a second supporting plate 4122 and a second guiding plate 4123. The second frame body 4121 is vertically arranged at a bottom end of a supporting frame 411, and a first through groove 4121*a* is provided on a side edge of the second frame body 4121. The second supporting plate 4122 is connected to a top end of the second frame body 4121, the second supporting plate 4122 is connected to the bottom end of the supporting frame 411, and a second through groove 4122*a* is provided on the second supporting plate 4122. The second guiding plate 4123 connects an outer side of the second frame body 4121 to a bottom end of the second supporting plate 4122, a third through groove 4123*a* is provided on the second guiding plate 4123, and the third through groove 4123*a* connects the first through groove 4121*a* to the second through groove 4122*a* in a communication manner, thereby forming a second heat dissipating channel 412*a*.

In the example, the second guiding plate 4123 includes an extending portion 4123*b* and a guiding portion 4123*c*. The extending portion 4123*b* is vertically connected to the bottom end of the second supporting plate 4122. One end of the guiding portion 4123*c* is connected to a bottom end of the extending portion 4123*b*, the other end of the guiding portion 4123*c* is located at a bottom end of the first through groove 4121*a*, and the other end of the guiding portion 4123*c* is connected to an outer side of the second frame body 4121. Further, a plane in which the wind guiding surface is located and a plane in which the guiding portion 4123*c* is located are parallel to each other, such that air conveniently flows.

Several camera mechanisms 2 are further arranged on a peripheral side of a shell 1, a first wind guiding plate 4115 is further arranged on a peripheral side of the first frame body 4111, and the first wind guiding plate 4115 is vertically arranged between adjacent camera mechanisms. The single camera mechanism 2 is located between adjacent first wind guiding plates 4115, thereby improving heat dissipation efficiency of a ventilating structure on the camera mechanism 2.

Moreover, in the example, a baffle 4124 is arranged at a top end of the second supporting plate 4122, a heat dissipating fin 422 is arranged at the top end of the second supporting plate 4122, the heat dissipating fin 422 is located above a second through hole, and the heat dissipating fin 422 is located between an outer ring of a first frame body 4111 and the baffle 4124. The heat dissipating fin 422 is arranged, thereby improving ventilation and heat dissipation efficiency of a ventilating structure on the panoramic camera.

A working principle of the heat dissipating support 41 of the present disclosure is as follows: a user inserts the memory card 7 into the first heat dissipating channel 411*a* of the heat dissipating support 41 from the first card slot 1*a* at the top end of the shell 1, such that a connector at the bottom end of the memory card 7 is inserted into a connector in the central control mechanism 3 at the bottom end of the heat dissipating support 41.

In an operation process of the panoramic camera, the central control mechanism 3 drives the fan 43 to rotate, so as to drive the air to be conveyed from the first vent hole 1*b* to the second vent hole 1*c*, thereby dissipating heat in the shell 1 for cooling. Moreover, the several camera mechanisms 2 are further arranged on the peripheral side of the shell 1, the first heat dissipating channel 411*a* is arranged in the center of the heat dissipating support 41, and the first heat dissipating channel 411*a* limits the memory card 7. The heat dissipating support 41 in the example is provided with the first heat dissipating channel 411*a* in a direction of a central axis, and the first heat dissipating channel 411*a* can be inserted into the memory card 7, thereby dissipating heat of the memory card. By arranging the second heat dissipating channel 412*a* on the peripheral side of the guiding frame 412, the heat dissipating support 41 guides wind to an inner peripheral side of the shell 1 for heat dissipation.

Moreover, an additional heat dissipating hole may be further provided on the first supporting plate 4112 in the example, or a heat dissipating gap is provided at a joint between the first supporting plate 4112 and the memory card 7. Thus, it is further convenient to circulate air at the peripheral side of the memory card 7, heat dissipation efficiency of the ventilating structure of the example is improved, and structural practicability is high.

A first wind guiding plate 4115 is further arranged on the peripheral side of the first frame body 4111 in the heat dissipating support 41, and the first wind guiding plate 4115 is vertically arranged between adjacent camera mechanisms. The single camera mechanism 2 is located between adjacent first wind guiding plates 4115, thereby improving heat dissipation efficiency of the ventilating structure on the camera mechanism 2.

Moreover, in the example, the baffle 4124 is arranged at the top end of the second supporting plate 4122, the heat dissipating fin 422 is arranged at the top end of the second supporting plate 4122, the heat dissipating fin 422 is located above the second through hole, and the heat dissipating fin 422 is located between the outer ring of the first frame body 4111 and the baffle 4124. The heat dissipating fin 422 is arranged, thereby improving ventilation and heat dissipation efficiency of the ventilating structure on the panoramic camera.

Thus, a ventilation process of the panoramic camera of the preferred example is completed.

The central control mechanism 3 in the example includes common circuit devices such as a circuit board and a controller, and connections between the central control mechanism 3 and the fan 43, the camera mechanism 2 and the memory card 7 are common circuit connection structures. Moreover, a control connection of the central control mechanism 3 is common automatic control, and is mostly applied to modern production, which will not be described herein.

In combination with FIGS. 1, 3 and 12-15, a structure of the shell 1 in the example is explained in detail as follows:

a supporting structure is arranged inside the shell 1, and the supporting structure includes a lower supporting plate 12, an upper supporting plate 13 and a fixing frame 14. A top end of the shell 1 is provided with a first card slot 1*a*, the first card slot 1*a* is used for inserting a memory card 7, a central control mechanism 3 is mounted at an inner bottom end of the shell 1, the memory card 7 is connected to the central control mechanism 3, several of camera mechanisms 2 are further arranged around the shell 1, and the several camera mechanisms 2 are connected to the central control mechanism 3.

The lower supporting plate 12 is connected to the inner bottom end of the shell 1. The upper supporting plate 13 is connected to an inner top end of the shell 1, and the upper supporting plate 13 and the lower supporting plate 12 are arranged opposite each other. The fixing frame 14 is arranged in the shell 1 and connects the upper supporting plate 13 to the lower supporting plate 12, and the several camera mechanisms 2 are connected to a peripheral side of the fixing frame 14. A heat dissipating support 41 is arranged in the shell 1 and is connected to an interior of the fixing frame 14.

The top end of the shell 1 is provided with the first card slot 1*a*, a first heat dissipating channel 411*a* is arranged in a center of a heat dissipating support 41, the first heat dissipating channel is in communication with the first card slot 1*a*, a central control mechanism 3 is arranged at a bottom end of the heat dissipating support 41, a side edge of the memory card 7 is clamped to the first card slot 1*a*, and a bottom end of the memory card 7 penetrates the first heat dissipating channel 411*a* and is inserted into the central control mechanism 3. The several camera mechanisms 2 are arranged, the several camera mechanisms 2 are arranged around an inner peripheral side of the shell 1, and the several camera mechanisms 2 are connected to the fixing frame 14. The heat dissipating support is arranged inside the shell 1. A passive heat dissipation design is used, such that a size is small, a structure is compact, and excellent heat dissipation in a compact camera structure is achieved through interconnection relations between various components in narrow space.

A structure of the fixing frame 14 is explained in detail as follows:

the camera mechanism 2 in the example includes a camera assembly and a display screen assembly 21 connected to each other. The fixing frame 14 includes a connecting plate 141, upper supporting columns 142, extending plates 143 and lower supporting legs 144. The connecting plate 141 is of an annular structure, several camera mounting holes are provided on a peripheral side of the connecting plate 141, and the camera mounting holes are used for assembling the camera assembly. The upper supporting columns 142 connect the connecting plate 141 to an upper supporting plate 13, thereby increasing top space of a supporting structure. Several upper supporting columns 142 are arranged, and the several upper supporting columns 142 are uniformly connected to an inner peripheral side of the connecting plate 141, thereby improving structural stability of the fixing frame 14.

The extending plates 143 are located at an inner ring of the connecting plate 141, one ends of the extending plates 143 are connected to the connecting plate 141, and the other ends of the extending plates 143 are connected to an outer ring of the heat dissipating support 41. Moreover, bottom ends of the upper supporting columns 142 in the example are connected to top surfaces of the extending plates 143, thereby improving structural stability of the fixing frame 14.

The lower supporting legs 144 connect the bottom ends of the extending plates 143 to the lower supporting plates 12, and several lower supporting legs 144 and several extending plates 143 are arranged. One lower supporting leg 144 corresponds to one extending plate 143, and the several extending plates 143 are uniformly arranged around the inner ring of the connecting plate 141, thereby improving structural stability of the fixing frame 14.

A connection structure between the shell 1 and the fixing frame 14 in the example is explained:

the shell 1 in the example includes an upper cover body 111 and a lower housing 112. The upper cover body 111 is located above the lower housing 112, and the upper cover body 111 and the lower housing 112 are spliced, such that it is convenient to produce and assemble the panoramic camera.

Further, a first inserting column 1111 is arranged at a bottom end of an inner side of the upper cover body 111, and a first inserting hole 1411 is provided at a top end of the connecting plate 141. The first inserting column 1111 is inserted into the first inserting hole 1411, thereby avoiding deviation of a joint position between the upper cover body 111 and the fixing frame 14, and improving stability of connection between the upper cover body 111 and the fixing frame 14.

Moreover, a second inserting column 1121 is arranged on an inner side of the lower housing 112, and a second inserting hole 1412 is provided at the bottom end of the connecting plate 141. The second inserting column 1121 is inserted into the second inserting hole 1412, thereby improving stability of connection between the lower housing 112 and the fixing frame 14, and avoiding misaligned shaking between the lower housing 112 and the fixing frame 14.

In the example, a reinforcing strip 1122 is arranged in the lower housing 112, and the reinforcing strip 1122 is supported and fixed to the bottom end of the connecting plate 141, thereby increasing a contact area between the lower housing 112 and the fixing frame 14, and further improving stability of connection between the lower housing 112 and the fixing frame 14.

A connection structure between the camera mechanism 2 and the fixing frame 14 in the example is explained:

the camera mechanism 2 in the example includes a camera assembly and a display screen assembly 21. In the example, several extending plates 143 are arranged, and the several extending plates 143 are arranged around an inner ring of the connecting plate 141. Several lower supporting legs 144 are arranged, and the several lower supporting legs 144 correspond to the several extending plates 143 one to one.

The lower supporting leg 144 in the example includes an inserting rod 1441, a mounting plate 1442 and a fixing plate 1443. The inserting rod 1441 is vertically connected to a bottom end of the extending plate 143, and a bottom end of the inserting rod 1441 is inserted into the lower supporting plate 12. The mounting plate 1442 is connected to one side of the inserting rod 1441, and the mounting plate 1442 is used for connecting a display screen assembly 21. The fixing plate 1443 is located on one side of the mounting plate 1442 close to the heat dissipating support 41, the fixing plate 1443 is connected to a side edge of the inserting rod 1441, and the fixing plate 1443 is used for connecting one side of the heat dissipating plate 421. A limiting groove is formed between the mounting plate 1442 and the fixing plate 1443, the heat dissipating plate 421 is accommodated in the limiting groove, and a side edge of the heat dissipating plate 421 is attached to the display screen assembly 21. The inserting rod 1441 is inserted into the lower supporting plate 12.

Further, in the example, the lower supporting leg 144 further includes a positioning rod 1444 connected to the bottom end of the fixing plate 1443. Moreover, a side edge of the positioning rod 1444 is connected to a side edge of the inserting rod 1441, a plane in which a bottom surface of the positioning rod 1444 is located is located above a plane in which a bottom surface of the inserting rod 1441 is located, and the positioning rod 1444 is inserted into the central control mechanism 3. Thus, a bottom end of the positioning rod 1444 may limit an inserting position of the lower supporting plate 12, thereby improving stability of the fixing frame 14 during use, and conveniently assembling the supporting structure.

The mounting plate 1442 conveniently assembles the display screen assembly 21. Further, the fixing plate 1443 for mounting and limiting the heat dissipating plate 421 is arranged on the lower supporting leg 144. The heat dissipating plate 421 improves stability of assembly of the display screen assembly 21, and the heat dissipating plate 421 further conveniently dissipates heat of the display screen assembly 21, thereby avoiding high thermal damage of the display screen assembly inside the shell 1, and prolonging service life of the display screen assembly 21.

Screw holes are provided on the mounting plate 1442 and the fixing plate 1443 in the example. The mounting plate 1442 is fixed to the display screen assembly 21 through a screw, and the fixing plate 1443 may be fixed to the heat dissipating plate 421 through a screw, thereby further improving structural stability of the fixing frame 14 integrating the display screen assembly 21 and the heat dissipating plate 421.

The several extending plates 143 include first extending plates 143*a* and second extending plates 143*b* adjacent to each other, and the several lower supporting legs 144 include first lower supporting legs 144*a* and second lower supporting legs 144*b* adjacent to each other. Top ends of the first lower supporting legs 144*a* are connected to the first extending plates 143*a*, and the second lower supporting legs 144*b* are connected to bottom ends of the second extending plates 143*b*. Outer sides of the first lower supporting legs 144*a* are connected to one side of the display screen assembly 21, and the second lower supporting legs 144*b* are connected to the other side of the display screen assembly 21.

Each first lower supporting leg 144*a* includes a first inserting rod 1441*a*, a first mounting plate 1442*a*, a first fixing plate 1443*a* and a first positioning rod 1444*a*. The first inserting rod 1441*a* is vertically connected to a bottom end of the first extending plate 143*a*, and a bottom end of the first inserting rod 1441*a* is inserted into the lower supporting plate 12. The first mounting plate 1442*a* is connected to one side of the first inserting rod 1441*a*, and the first mounting plate 1442*a* is used for connecting one side of the display screen assembly 21. The first fixing plate 1443*a* is located on one side of the first mounting plate 1442*a* close to the heat dissipating support 41, the first fixing plate 1443*a* is connected to a side edge of the first inserting rod 1441*a*, and the first fixing plate 1443*a* is used for connecting one side of the heat dissipating plate 421.

The first positioning rod 1444*a* is connected to a bottom end of the first fixing plate 1443*a*, a side edge of the first positioning rod 1444*a* is connected to a side edge of the first inserting rod 1441*a*, a plane in which the bottom surface of the first positioning rod 1444*a* is located is located above a plane in which the bottom surface of the first inserting rod 1441*a* is located, and the first positioning rod 1444*a* is inserted into the central control mechanism 3, thereby limiting an inserting position of the first lower supporting leg 144*a* and the lower supporting plate 12, and improving stability of the first lower supporting leg 144*a* during use.

The second lower supporting leg 144*b* includes a second inserting rod 1441*b*, a second mounting plate 1442*b*, a second fixing plate 1443*b* and a second positioning rod 1444*b*. The second inserting rod 1441*b* is vertically connected to the bottom end of the second extending plate 143*b*, and a bottom end of the second inserting rod 1441*b* is inserted into the lower supporting plate 12. The second mounting plate 1442*b* is connected to a side edge of the second inserting rod 1441*b*, the second mounting plate 1442*b* and the first mounting plate 1442*a* are arranged opposite each other, and the second mounting plate 1442*b* is used for connecting the other side of the display screen assembly 211. The second fixing plate 1443*b* is connected to a side edge of the second inserting rod 1441*b*, the second fixing plate 1443*b* is located on one side of the second mounting plate 1442*b* close to the heat dissipating support 41, the second fixing plate 1443*b* and the first fixing plate 1443*a* are arranged opposite each other, and the second fixing plate 1443*b* is used for connecting the other side of the heat dissipating plate 421.

The second positioning rod 1444*b* is connected to the bottom end of the second fixing plate 1443*b*, the side edge of the second positioning rod 1444*b* is connected to the side edge of the second inserting rod 1441*b*, a plane in which the bottom surface of the second positioning rod 1444*b* is located is located above a plane in which the bottom surface of the second inserting rod 1441*b* is located, and the second positioning rod 1444*b* is inserted into the central control mechanism 3, thereby limiting an inserting position of the second lower supporting leg 144*b* and the lower supporting plate 12, and improving stability of the second lower supporting leg 144*b* during use.

The panoramic camera in the example further includes a camera cover plate 15. The top end of the connecting plate 141 in the example is provided with a camera mounting groove 1413, the camera cover plate 15 is connected to the top end of the connecting plate 141, and space between the camera mounting groove 1413 and the camera cover plate 15 is sealed to form a camera mounting hole. Such a structure conveniently mounts the camera assembly and further conveniently disassembles, assembles and maintains the camera assembly, and has high structural practicability.

A connection structure between the fixing frame 14 and the heat dissipating support 41 is explained in detail as follows:

in the example, the outer ring of the heat dissipating support 41 is provided with the first connecting columns 4114, the other ends of the extending plates 143 are provided with the first positioning grooves 1431, and the first connecting columns 4114 are clamped to the first positioning grooves 1431. Several first connecting columns 4114 are arranged, the several first connecting columns 4114 correspond to the several extending plates 143 one to one, and the first positioning grooves 1431 on the extending plates 143 support the heat dissipating support 41, thereby improving stability of connection between the heat dissipating support 41 and the fixing frame 14. The first connecting columns 4114 are embedded into the first positioning grooves 1431, thereby preventing the heat dissipating support 41 from shaking inside the fixing frame 14.

Further, the first connecting columns 4114 and the extending plate 143 are provided with second screw holes, the second screw holes on the extending plates 143 are located in the first positioning grooves 1431, and the first connecting columns 4114 and the extending plates 143 are further fixed through screws, thereby further improving stability of connection between the heat dissipating support 41 and the fixing frame 14.

A connection structure between the shell 1 and the fan 43 in the example is explained:

the top end of the shell 1 is provided with the first vent hole 1*b*, the bottom end of the shell 1 is provided with the second vent hole 1*c*, the first vent hole 1*b* is in communication with the second vent hole 1*c*, and a fan 43 is further mounted in the shell 1.

The fan 43 in the example is fixed to the bottom end of the lower supporting plate 12, and a fan accommodating groove 121 is provided at the bottom end of the lower supporting plate 12, thereby improving stability of connection between the fan 43 and the lower supporting plate 12, further avoiding shaking wear between the fan 43 and the lower housing 112, and improving practicability of a structure.

Further, in the example, the lower supporting plate 12 is connected and fixed to the bottom end of the lower housing 112 through a bolt, thereby further improving structural stability of the lower supporting plates 12, and improving stability of an overall structure of the panoramic camera.

In combination with FIGS. 1 and 16-20, other structures of the shell 1 in the example are explained:

a handle 5 is connected to a top end of a shell 1 in the example, and is convenient to take. The panoramic camera in the example further includes camera mechanisms surrounding a periphery of the shell 1, and a central control mechanism 3 arranged inside the shell 1. The central control mechanism is connected to the several camera mechanisms 2, the central control mechanism 3 includes a control circuit board, and a memory card 7 is connected to the several camera mechanisms 2 through control circuit boards. The top end of the shell 1 is provided with a first card slot 1*a*, and the first card slot 1*a* is used for inserting the memory card.

The handle 5 is connected to the top end of the shell 1, and the handle 5 is located above the first card slot 1*a*. One side of the top end of the shell 1 is rotatably connected to one side of the handle 5, the other side of the top end of the shell 1 is provided with a clamping mechanism 6, the other side of the handle 5 is provided with a second card slot 5*a*, and the clamping mechanism 6 is clamped to the second card slot 5*a*.

According to the panoramic camera of the present disclosure, the camera mechanisms 2 are arranged around a periphery of the shell 1 for panoramic photographing, and the first card slot 1*a* provided at the top end of the shell 1 is inserted into the memory card 7. Compared with longitudinal structural arrangement inside a traditional panoramic camera, less space is occupied. The handle 5 is fixed at the top end of the shell 1, such that the panoramic camera is convenient to carry. Moreover, it is convenient for a user to take out the panoramic camera through the handle 5 for mobile photographing. The panoramic camera has a compact overall structure, a small apparatus size and portability. Moreover, the handle 5 is movably connected to the top end of the shell 1, such that the memory card 7 is convenient to insert and pull, and structural practicability is high.

A joint between the shell 1 and the handle 5 in the example is explained in detail as follows:

a clamping mechanism 6 in the example includes a first fixing seat 61, a positioning plate 62, a first elastic member 63, a limiting plate 64 and a second elastic member 65. The first fixing seat 61 is connected to the other side of the top end of the shell 1, an interior of the first fixing seat 61 is of a hollow structure, and a fourth through hole is provided on one side of the first fixing seat 61 close to the handle 5. The positioning plate 62 is movably arranged inside the first fixing seat 61, and the positioning plate 62 is used for being clamped to the second card slot 5*a*. The first elastic member 63 is arranged on one side of the positioning plate 62 away from the fourth through hole, the first elastic member 63 presses the positioning plate 62, and the positioning plate 62 penetrates the fourth through hole and is clamped to the second card slot 5*a*. The first elastic member 63 elastically presses the positioning plate 62 to be clamped to the second card slot 5*a*, thereby improving stability of clamping between the handle 5 and the positioning plate 62, and preventing the handle 5 from falling off.

In the example, a first adjusting hole 61*a* is provided at the top end of the first fixing seat 61. The positioning plate 62 includes an inserting portion 621, a connecting portion 622 and a first pressing portion 623. The inserting portion 621 is arranged at one end of the positioning plate 62, and the inserting portion 621 is used for being inserted into the second card slot 5*a*. The connecting portion 622 is arranged in a middle of the positioning plate 62, and one side of the connecting portion 622 is connected to the inserting portion 621. The first pressing portion 623 is connected to the top end of the connecting portion 622, and the first pressing portion 623 penetrates the first adjusting hole 61*a* and extends.

Further, it is convenient for a user to press and control the positioning plate 62 through the first pressing portion 623, thereby conveniently disassembling and assembling the handle 5. The first pressing portion 623 penetrates the first adjusting hole 61*a* and extends, and the first pressing portion 623 may limit a position of the positioning plate 62, thereby preventing the positioning plate 62 from falling off from the first fixing seat 61, and improving stability of a structure during use.

In the example, the first elastic member 63 is a first spring, a first positioning column 6221 is arranged on one side of the connecting portion 622 away from the inserting portion 621, and the first positioning column 6221 is inserted into the first elastic member 63, thereby improving stability of connection between the first elastic member 63 and the positioning plate 62.

In the example, one side of the first fixing seat 61 is provided with a positioning protrusion 611, and a bottom end of the other side of the handle 5 is provided with a positioning groove 5*b*. The positioning protrusion 611 is clamped to the positioning groove 5*b*, thereby increasing a contact surface between the first fixing seat 61 and the handle 5, preventing the handle 5 from shaking, and further improving stability of connection between the shell 1 and the handle 5.

In the example, the connecting portion 622 has a width greater than a width of the inserting portion 621, and the fourth through hole has a width between a width of the connecting portion 622 and a width of the inserting portion 621. By limiting a size of the positioning plate 62 and the fourth through hole of the first fixing seat 61, the positioning plate 62 is prevented from falling off, and stability of connection between the positioning plate 62 and the first fixing seat 61 is improved.

Further, one end of the positioning plate 62 in the example is provided with a first limiting groove 62*a*, and the clamping mechanism 6 further includes a limiting plate 64 and a second elastic member 65. The limiting plate 64 is arranged at one end of the positioning plate 62, the limiting plate 64 is slidably connected to the first fixing seat 61, and the limiting plate 64 is used for being clamped to the first limiting groove 62*a*. The second elastic member 65 connects one side of the limiting plate 64 to the first fixing seat 61, and the second elastic member 65 presses the limiting plate 64. The second elastic member 65 elastically drives the limiting plate 64 to be clamped to the first limiting groove 62*a*, so as to limit a position of the positioning plate 62 in the first fixing seat 61, thereby improving structural stability of the positioning plate 62 during use.

A second limiting groove 64*a* and a third limiting groove 64*b* are provided on a side edge of the limiting plate 64 in the example, and the second limiting groove 64*a* is located on one side of the third limiting groove 64*b* close to the positioning plate 62. When the first elastic member 63 is connected to the second limiting groove 64*a*, the limiting plate 64 is clamped to the first limiting groove 62*a*. When the first elastic member 63 is connected to the third limiting groove 64*b*, the limiting plate 64 is farther away from the first limiting groove 62*a*.

Further, one side of the second elastic member 65 is provided with a connecting block 66, and the connecting block 66 abuts against the side edge of the limiting plate 64, thereby improving stability of the second elastic member 65 elastically pressing the side edge of the limiting plate 64. In order to avoid wear of the second elastic member 65 and the side edge of the limiting plate 64, the connecting block 66 in the example is preferably of a spherical structure. Thus, it is convenient to switch the connecting block between the second limiting groove 64*a* and the third limiting groove 64*b*, and wear of the connecting block 66 and the side edge of the limiting plate 64 is small.

In the example, a second pressing portion 641 is arranged at the top end of the limiting plate 64, a second adjusting hole 61*b* is provided at a top end of the first fixing seat 61, and the second pressing portion 641 penetrates the second adjusting hole 61*b* and extends. By driving the second pressing portion 641, the user conveniently adjusts a position of the limiting plate 64, thereby controlling limiting or releasing of limiting of the positioning plate 62 by the limiting plate 64.

A working principle of mounting the memory card 7 on the panoramic camera of the present disclosure is as follows:

1. the handle 5 is disassembled from the first fixing seat 61.

Firstly, the limiting plate 64 is pushed backwards, and the second elastic member 65 drives the connecting block 66 to press the second limiting groove 64*a*. In this case, the limiting plate 64 is farther away from the positioning plate 62.

Next, the positioning plate 62 is pushed leftwards, and the positioning plate 62 is accommodated in the first fixing seat 61, such that the positioning plate 62 is separated from the second card slot 5*a* on the handle 5.

Then, the handle 5 is rotated clockwise upwards, such that the handle 5 is away from the first fixing seat 61 to expose the first card slot 1*a*.

2. The positioning plate 62 is loosened to insert the memory card 7 into the first card slot 1*a*.
3. The handle 5 is mounted on the first fixing seat 61.

Firstly, the positioning plate 62 is pushed leftwards, such that the positioning plate 62 is accommodated in the first fixing seat 61.

Next, the handle 5 is rotated reversely, such that the second card slot 5*a* is in communication with the fourth through hole, and the positioning groove 5*b* on the handle 5 is clamped to the positioning protrusion 611 on the side edge of the first fixing seat 61 to position the handle 5.

Then, the positioning plate 62 is loosened, and the first elastic member 63 elastically drives the positioning plate 62 to be clamped to the second inserting groove, thereby fixing the handle 5.

Finally, the limiting plate 64 is pushed forwards, and the second spring drives the connecting block 66 to jump from the second limiting groove 64*a* to the third limiting groove 64*b*, such that the limiting plate 64 is clamped to the first limiting groove 62*a* on the side edge of the positioning plate 62, to improve stability of clamping between the positioning plate 62 and the handle 5.

Thus, the process of mounting the memory card 7 on the panoramic camera of the preferred example is completed.

The central control mechanism 3 in the example includes control circuit boards. The memory card 7 is connected to the several camera mechanisms through the control circuit boards, which is an existing technology of circuit connection. A connection mode is commonly used in industrial automatic control, which is not described herein.

In combination with FIGS. 3 and 21-26, a structure of a memory card in the example is explained in detail:

the memory card 7 includes a card body 71 and a first housing 72. The card body 71 includes several memory chips connected to each other, and a connector 711 is arranged at a bottom end of the card body 71. The first housing 72 is of a hollow structure, and the card body 71 is arranged inside the first housing 72. The first housing 72 includes a second fixing seat 721, an inserting cylinder 722 and a cap 723. The second fixing seat 721 is arranged at the bottom end of the card body 71, and the second fixing seat 721 is of a hollow structure having an open top end. A connecting hole 7211 is provided at the bottom end of the second fixing seat 721, and a connector 711 penetrates the connecting hole 7211 and extends.

The inserting cylinder 722 sleeves an outer ring of the card body 71, and the inserting cylinder 722 is inserted into the second fixing seat 721. The cap 723 is arranged at the top end of the card body 71, and the cap 723 is inserted into a top end of the inserting cylinder 722. A second heat dissipating groove 7221 is provided on an outer side of the inserting cylinder 722.

According to the memory card in the example, the first housing 72 is assembled outside the card body 71, and the card body 71 includes several memory card chips, thereby improving stability of the memory card. The first housing 72 is assembled through the second fixing seat 721, the inserting cylinder 722 and the cap 723, thereby conveniently assembling the memory card 7. Moreover, the second heat dissipating groove 7221 is provided on an outer side of the inserting cylinder 722, such that heat of the memory card 7 is conveniently dissipated, and structural practicality is high.

A structure of the first housing 72 in the example is explained in detail:

in the example, the bottom end of the second fixing seat 721 is provided with a fourth vent hole 7212, and the fourth vent hole 7212 is in communication with the second heat dissipating groove 7221, thereby improving ventilation performance of the first housing 72, and conveniently circulating air inside the first housing 72 for heat dissipation.

A first inserting groove 7213 is provided inside the second fixing seat 721, a first inserting protrusion 7222 is arranged on a side edge of a bottom end of the inserting cylinder 722, and the first inserting protrusion 7222 is inserted into the first inserting groove 7213, thereby preventing a joint between the inserting cylinder 722 and the second fixing seat 721 from shaking, and improving stability of connection between the second fixing seat 721 and the inserting cylinder 722.

Moreover, an inner wall of the cap 723 is provided with a second inserting groove 7231, and an outer side of a top end of the inserting cylinder 722 is provided with a second inserting protrusion 7223. The second inserting protrusion 7223 is inserted into the second inserting groove 7231, thereby improving stability of mounting between the cap 723 and the inserting cylinder 722.

A structure of the connector 711 in the example is explained as follows:

the connector 711 includes a third end portion 7111 and a fourth end portion 7112. One side of the third end portion 7111 is connected to one side of the bottom end of the card body 71. The fourth end portion 7112 is connected to one side of the bottom end of the third end portion 7111, and the fourth end portion 7112 penetrates the connecting hole 7211 and extends. A second separator plate 7214 is arranged inside the second fixing seat 721, the second separator plate 7214 is located at the other side of the fourth end portion 7112, and the second separator plate 7214 is used for supporting the other side of the bottom end of the third end portion 7111.

A third guiding plate 7215 is further arranged in the second fixing seat 721, and the third guiding plate 7215 is located at the other side of the fourth end portion 7112. An inserting port is formed between the third guiding plate 7215 and the supporting plate, the inserting port is located above the connecting hole 7211, the inserting port is away from one end of the connecting hole 7211, and a distance between the third guiding plate 7215 and the supporting plate is gradually increased.

The inserting cylinder 722 in the example includes a third supporting plate 7224 and a fourth supporting plate 7225 spliced to each other. The card body 71 is located between the third supporting plate 7224 and the fourth supporting plate 7225, and the card body 71 is connected to the third supporting plate 7224, thereby improving stability of connection between the inserting cylinder 722 and the card body 71.

An outer side of the cap 723 is further provided with a card slot, such that it is convenient for the user to insert and pull the memory card 7 of the present application. Two sides of a top end of the cap 723 are vertically provided with pressing grooves 7232, it is convenient to mount the memory card through the pressing grooves 7232, and the cap 723 has high structural practicality.

Moreover, two ends of an interior of the second fixing seat 721 are vertically provided with third inserting grooves 7216, and the card body 71 is inserted into the third inserting grooves 7216, thereby improving stability of connection between the card body 71 and the first housing 72.

A chamfer 724 is arranged on the side edge of the first housing 72, thereby preventing a corner of the memory card from being easily worn.

Moreover, a first screw hole is provided on the side edge of the inserting cylinder 722, a first connecting hole 7211 is provided at the bottom end of the second fixing seat 721, the first screw hole corresponds to the first connecting hole 7211 in position, and the inserting cylinder 722 is connected to the second fixing seat 721 through a first screw, such that the memory card has high stability.

A process of assembly of the memory card 7 in the present disclosure is as follows:

1. A card body 71 is assembled to an inserting cylinder 722.

Firstly, an inner wall of a third supporting plate 7224 is connected to the card body 71 through a screw; and then the third supporting plate 7224 and a fourth supporting plate 7225 are spliced. The third supporting plate 7224 and the fourth supporting plate 7225 are spliced to form the inserting cylinder 722.

2. The inserting cylinder 722 is assembled to a second fixing seat 721.

Firstly, a connector 711 at a bottom end of the card body 71 is aligned with a connecting hole 7211 on the second fixing seat 721, and a first inserting protrusion 7222 on a side edge of the inserting cylinder 722 is aligned with a first inserting groove 7213 on an inner wall of the second fixing seat 721. Next, the inserting cylinder 722 is inserted into the second fixing seat 721 downwards, such that the connector 711 penetrates the connecting hole 7211 and extends. After the first inserting protrusion 7222 on the side edge of the inserting cylinder 722 is inserted into the first inserting groove 7213 on the inner wall of the second fixing seat 721, the inserting cylinder 722 is inserted into the second fixing seat 721 in place. Then, a first screw hole provided on the side edge of the inserting cylinder 722 is fixedly connected to the first connecting hole 7211 on the second fixing seat 721 through a screw.

3. The inserting cylinder 722 is assembled to a cap 723.

The cap 723 is aligned with the top end of the inserting cylinder 722, and the second inserting protrusion 7223 at the top end of the side edge of the inserting cylinder 722 is aligned with a second inserting groove 7231 on an inner side of the cap 723. Next, the cap 723 is inserted into the top end of the inserting cylinder 722, such that the second inserting protrusion 7223 at the top end of the side edge of the inserting cylinder 722 is inserted into the second inserting groove 7231 on the inner side of the cap 723. Then, the inserted cap 723 is fixedly connected to the inserting cylinder 722 through a screw.

Thus, the process of assembly of the memory card of the preferred example is completed.

In a process of use of the memory card in the example, the bottom end of the second fixing seat 721 is provided with the fourth vent hole 7212, and the fourth vent hole 7212 is in communication with the bottom end of the second heat dissipating groove 7221 on the side edge of the inserting cylinder 722. Thus, ventilation performance of the first housing 72 is improved, it is convenient to circulate air inside the first housing 72 for heat dissipation, and heat dissipation performance of the memory card is excellent.

Moreover, the card body 71 in the example further includes several sheet memory card bodies connected, such that storage capacity of the card body 71 is increased, and use is convenient. An assembly mode and a structure of the memory card are similar to a structure of an existing memory such as a hard disk, which will not be described herein.

Mounting steps of the panoramic camera of the present disclosure are as follows:

1. a fan 43 is assembled to a lower supporting plate 12.

The fan 43 is accommodated in a fan accommodating groove 121 of a lower supporting plate 12, and then the fan 43 is fixed to the lower supporting plate 12 through a screw.

2. The lower supporting plate 12 is connected to a lower housing 112 through a screw.
3. A central control mechanism 3 is mounted on the lower housing 112, and it is ensured that a through hole on the lower supporting plate 12 corresponds to a through hole on the central control mechanism 3 in a mounting process.
4. A camera mechanism 2 is assembled on a fixing frame 14.

Firstly, a display screen assembly 21 is mounted on a first mounting plate 1442*a* and a second mounting plate 1442*b* of a fixing frame 14 through a screw. Then, a camera assembly is clamped and fixed in a camera mounting groove on a connecting plate 141 through a camera cover plate 45.

The operation is repeated until the several camera mechanisms 2 are all mounted on a peripheral side of the fixing frame 14.

5. The fixing frame 14 is assembled into the lower housing 112.

A lower supporting leg of the fixing frame 14 is inserted into the lower housing 112, and an inserting rod 1441 of the lower supporting leg 144 sequentially penetrates the central control mechanism 3 and is inserted into the lower supporting plate 12. A bottom end of a positioning rod of the lower supporting leg 144 is inserted into the central control mechanism 3, and the bottom end of the positioning rod 1444 defines an inserting position of the lower supporting leg 144 and the lower supporting plate 12, thereby avoiding wear caused by excessive mounting of the lower supporting leg 144.

In the assembled fixing frame 14, a second inserting column 1121 arranged at the top end of the peripheral side of the lower housing 112 is inserted into a second inserting hole 1412 at a bottom end of a connecting plate 141 in the fixing frame 14, thereby improving stability of connection between the fixing frame 14 and the lower housing 112.

6. A heat dissipating support 41 is assembled into the lower housing 112.

A first heat dissipating channel of the heat dissipating support 41 is approximately aligned with a connector 711 on the central control mechanism 3. Then, a first connecting column 4114 on a peripheral side of the heat dissipating support 41 is clamped into first positioning groove 1431 of an extending plate 143, and then the first connecting column 4114 is fixedly connected to the extending plate 143 through a screw.

7. A heat dissipating mechanism is assembled into the lower housing 112.

The heat dissipating mechanism in the example includes a heat dissipating plate 421, a heat dissipating fin 422 and a heat pipe 423. The heat dissipating plate 421 is inserted into a gap between the first mounting plate 1442*a* and a first fixing plate 1443, and then the first fixing plate 1443 is connected to the heat dissipating plate 421 through a bolt. The heat dissipating fin 422 is connected to the heat dissipating plate 421 through the heat pipe 423. The heat dissipating fin 422 in the example is placed on an outer side of the heat dissipating support 41.

several heat dissipating mechanisms 42 are arranged in the example, and the several heat dissipating mechanisms 42 correspond to the several camera mechanisms 2 one to one.

8. An upper supporting plate 13 is connected to an upper supporting column 142 through a screw.

9. An upper cover body 111 is connected to the fixing frame 14.

Firstly, the upper cover body 111 is assembled from top to bottom, a first inserting column 1111 at a bottom end of the upper cover body 111 is inserted into a first inserting hole 1411 of the connecting plate 141, and the upper cover body 111 is hermetically spliced to the outer side of the lower housing 112. Then, the upper cover body 111 is fixedly connected to the upper supporting plate 13 through a screw, thereby improving overall stability of a fixing structure.

Thus, the process of assembly of the panoramic camera of the preferred example is completed.

A process of use of the panoramic camera of the example is as follows:

vent holes are provided on an upper portion and a lower portion of a housing 1, and an inner bottom end of the shell 1 matches a fan 43, such that air inside the shell 1 circulates at a high speed to dissipate heat. A first heat dissipating channel 411*a* is arranged in a center of a heat dissipating support 41 such that the heat dissipating support 41 can support a memory card 7, and moreover, it is convenient for wind circulating in the shell 1 to dissipate heat of the memory card 7. Several second heat dissipating channels 412*a* are arranged around a peripheral side of the heat dissipating support 41. The several second heat dissipating channels 412*a* are arranged on the peripheral side of the heat dissipating support 41, such that wind circulated by the fan 43 can be guided towards the peripheral side. Thus, a camera mechanism 2 arranged on a peripheral side of the shell 1 can be ventilated for heat dissipation, thereby improving practicability of a ventilating structure, and improving a heat dissipation effect of the panoramic camera.

Moreover, a heat dissipating mechanism 42 is connected to the single camera mechanism 2 through a heat dissipating plate 421 for heat dissipation. The heat dissipating support 41 is mounted in a middle of the shell 1, and the heat dissipating support 41 dissipates heat of a configuration area of a memory card 7. Moreover, a heat dissipating fin 422 is arranged between the heat dissipating plate 421 and an outer side of the heat dissipating support 41, thereby improving a heat dissipation effect of the heat dissipating mechanism and heat dissipation efficiency of the heat dissipating plate 421 and the heat dissipating support 41. Further, the heat dissipating plate 421 is connected to the heat dissipating fin 422 through a heat pipe 423, and the heat pipe 423 is inserted into the heat dissipating fin 422 in a penetrating manner, thereby improving heat conduction efficiency of the heat dissipating plate 421, and further conveniently dissipating heat of the camera mechanism 2.

To sum up, although the present disclosure has been disclosed in the preferred example as described above, the preferred example is not intended to limit the present disclosure. Those of ordinary skill in the art can make various changes and modifications without departing from the spirit and scope of the present disclosure. Therefore, the scope of protection of the present disclosure shall be subject to the scope defined by the claims.

What is claimed is:

1. A panoramic camera, comprising:

a shell, wherein a top end of the shell is provided with a first vent hole and a first card slot, the first card slot is located in a center of the top end of the shell and extends into the shell, a bottom end of the shell is provided with a second vent hole, and the first vent hole is in communication with the second vent hole;

camera mechanisms, wherein several camera mechanisms are arranged, the several camera mechanisms are arranged around a peripheral side of the shell, and the camera mechanisms are used for photographing pictures;

a central control mechanism mounted in the shell, wherein the central control mechanism is connected to the camera mechanisms;

a memory card, wherein a top end of the memory card is inserted into the first card slot, and a bottom end of the memory card is inserted into the central control mechanism;

a heat dissipating support mounted in the shell, wherein the heat dissipating support is located above the central control mechanism, a first heat dissipating channel is arranged in a center of the heat dissipating support, and the memory card penetrates the first heat dissipating channel;

heat dissipating mechanisms arranged between an outer side of the heat dissipating support and the camera mechanisms, wherein several heat dissipating mechanisms are arranged, the several heat dissipating mechanisms are arranged around the outer side of the heat dissipating support, and the several heat dissipating mechanisms are connected to the several camera mechanisms respectively; and a fan arranged inside the shell and located at a bottom end of the heat dissipating support, wherein the fan circulates air between the first vent hole and the second vent hole, wherein each heat dissipating mechanism comprises:

a heat dissipating plate, wherein one side of the heat dissipating plate is connected to the camera mechanism, and two ends of the heat dissipating plate are connected to the shell;

a heat dissipating fin connected to an outer wall of the heat dissipating support; and a heat pipe, wherein the heat pipe connects a heat dissipating sheet to the outer side of the heat dissipating support, and the heat pipe penetrates the heat dissipating fin;

the shell is internally provided with:

a lower supporting plate connected to an inner bottom end of the shell;

an upper supporting plate connected to an inner top end of the shell, wherein the upper supporting plate and the lower supporting plate are arranged opposite each other; and a fixing frame arranged in the shell and connecting the upper supporting plate to the lower supporting plate, wherein the several camera mechanisms are connected to a peripheral side of the fixing frame;

a handle is further connected to the top end of the shell, and the handle is located above the first card slot; and one side of the top end of the shell is rotatably connected to one side of the handle, the other side of the top end of the shell is provided with a clamping mechanism, the other side of the handle is provided with a second card slot, and the clamping mechanism is clamped to the second card slot.

2. The panoramic camera according to claim 1, wherein each camera mechanism comprises a camera assembly and a display screen assembly, the camera assembly is connected to the display screen assembly, and the fixing frame comprises:

a connecting plate of an annular structure, wherein a camera mounting hole is provided at a top end of the connecting plate, and the camera mounting hole is used for mounting the camera assembly;

an upper supporting column connecting the connecting plate to the upper supporting plate;

extending plates located at an inner ring of the connecting plate, wherein one end of each extending plate is connected to the connecting plate, and the other end of each extending plate is connected to an outer ring of the heat dissipating support; and lower supporting legs connecting bottom ends of the extending plates to the lower supporting plate, and an outer side of each lower supporting leg is connected to the display screen assembly.

3. The panoramic camera according to claim 1, wherein several second heat dissipating channels are arranged on a peripheral side of the heat dissipating support, and the several second heat dissipating channels are arranged around an extending direction of the first heat dissipating channel as a center.

4. The panoramic camera according to claim 3, wherein a third vent hole is provided in a center of the central control mechanism, and the third vent hole is in communication with the first vent hole and the second vent hole; and the heat dissipating support comprises:

a supporting frame connected to an inner wall of the shell, wherein the first heat dissipating channel is located in a center of the supporting frame; and a guiding frame connected to a bottom end of the supporting frame, wherein the several second heat dissipating channels are arranged around a peripheral side of the guiding frame, and the several second heat dissipating channels are in communication with the third vent hole.

5. The panoramic camera according to claim 4, wherein the supporting frame comprises:

a first frame body, wherein an outer side of the first frame body is connected to the inner wall of the shell, and a bottom end of the first frame body is connected to an inner ring of the guiding frame;

first supporting plates, wherein two first supporting plates are arranged, the two first supporting plates are oppositely arranged on two sides of an interior of the first frame body, and the first heat dissipating channel is formed between the two first supporting plates; and first guiding plates arranged at the bottom end of the supporting frame, wherein the first guiding plates connect the first frame body to the first supporting plates, and the first guiding plates guide air between the second heat dissipating channels and the third vent hole.

6. The panoramic camera according to claim 5, wherein the guiding frame comprises:

a second frame body vertically arranged at the bottom end of the supporting frame, wherein a first through groove is provided at a side edge of the second frame body;

a second supporting plate connected to a top end of the second frame body, wherein the second supporting plate is connected to the bottom end of the supporting frame, and a second through groove is provided on the second supporting plate; and a second guiding plate connecting an outer side of the second frame body to a bottom end of the second supporting plate, wherein a third through groove is provided on the second guiding plate, and the third through groove causes the first through groove to be in communication with the second through groove, so as to form the second heat dissipating channels.

7. The panoramic camera according to claim 6, wherein a baffle is arranged at a top end of the second supporting plate, heat dissipating fins are arranged at the top end of the second supporting plate, the heat dissipating fins are located above the second through hole, and the heat dissipating fins are located between an out ring of the first frame body and the baffle.

8. A panoramic camera, comprising:

a shell, wherein a top end of the shell is provided with a first vent hole and a first card slot, the first card slot is located in a center of the top end of the shell and extends into the shell, a bottom end of the shell is provided with a second vent hole, and the first vent hole is in communication with the second vent hole;

camera mechanisms, wherein several camera mechanisms are arranged, the several camera mechanisms are arranged around a peripheral side of the shell, and the camera mechanisms are used for photographing pictures;

a central control mechanism mounted in the shell, wherein the central control mechanism is connected to the camera mechanisms;

a memory card, wherein a top end of the memory card is inserted into the first card slot, and a bottom end of the memory card is inserted into the central control mechanism;

a heat dissipating support mounted in the shell, wherein the heat dissipating support is located above the central control mechanism, a first heat dissipating channel is arranged in a center of the heat dissipating support, and the memory card penetrates the first heat dissipating channel;

heat dissipating mechanisms arranged between an outer side of the heat dissipating support and the camera mechanisms, wherein several heat dissipating mechanisms are arranged, the several heat dissipating mechanisms are arranged around the outer side of the heat dissipating support, and the several heat dissipating mechanisms are connected to the several camera mechanisms respectively; and a fan arranged inside the shell and located at a bottom end of the heat dissipating support, wherein the fan circulates air between the first vent hole and the second vent hole.

9. The panoramic camera according to claim 8, wherein each heat dissipating mechanism comprises:

a heat dissipating plate, wherein one side of the heat dissipating plate is connected to the camera mechanism, and two ends of the heat dissipating plate are connected to the shell;

heat dissipating fins connected to an outer wall of the heat dissipating support; and a heat pipe, wherein the heat pipe connects a heat dissipating sheet to the outer side of the heat dissipating support, and the heat pipe penetrates the heat dissipating fins.

10. The panoramic camera according to claim 8, wherein the shell is internally provided with:

a lower supporting plate connected to an inner bottom end of the shell;

an upper supporting plate connected to an inner top end of the shell, wherein the upper supporting plate and the lower supporting plate are arranged opposite each other; and a fixing frame arranged in the shell and connecting the upper supporting plate to the lower supporting plate, wherein the several camera mechanisms are connected to a peripheral side of the fixing frame.

11. The panoramic camera according to claim 10, wherein each camera mechanism comprises a camera assembly and a display screen assembly, the camera assembly is connected to the display screen assembly, and the fixing frame comprises:

a connecting plate of an annular structure, wherein a camera mounting hole is provided at a top end of the connecting plate, and the camera mounting hole is used for mounting the camera assembly;

an upper supporting column connecting the connecting plate to the upper supporting plate;

extending plates located at an inner ring of the connecting plate, wherein one end of each extending plate is connected to the connecting plate, and the other end of each extending plate is connected to an outer ring of the heat dissipating support; and lower supporting legs connecting bottom ends of the extending plates to the lower supporting plate, and outer sides of the lower supporting legs are connected to the display screen assembly.

12. The panoramic camera according to claim 8, wherein a handle is further connected to the top end of the shell, and the handle is located above the first card slot; and one side of the top end of the shell is rotatably connected to one side of the handle, the other side of the top end of the shell is provided with a clamping mechanism, the other side of the handle is provided with a second card slot, and the clamping mechanism is clamped to the second card slot.

13. The panoramic camera according to claim 12, wherein several second heat dissipating channels are arranged on a peripheral side of the heat dissipating support, and the several second heat dissipating channels are arranged around an extending direction of the first heat dissipating channel as a center.

14. The panoramic camera according to claim 13, wherein a third vent hole is provided in a center of the central control mechanism, and the third vent hole is in communication with the first vent hole and the second vent hole; and the heat dissipating support comprises:

a supporting frame connected to an inner wall of the shell, wherein the first heat dissipating channel is located in a center of the supporting frame; and a guiding frame connected to a bottom end of the supporting frame, wherein the several second heat dissipating channels are arranged around a peripheral side of the guiding frame, and the several second heat dissipating channels are in communication with the third vent hole.

15. The panoramic camera of claim 14, wherein the supporting frame comprises:

a first frame body, wherein an outer side of the first frame body is connected to the inner wall of the shell, and a bottom end of the first frame body is connected to an inner ring of the guiding frame;

first supporting plates, wherein two first supporting plates are arranged, the two first supporting plates are oppositely arranged on two sides of an interior of the first frame body, and the first heat dissipating channel is formed between the two the first supporting plates; and first guiding plates arranged at the bottom end of the supporting frame, wherein the first guiding plates connect the first frame body to the first supporting plates, and the first guiding plates guide air between the second heat dissipating channels and the third vent hole.

16. The panoramic camera of claim 15, wherein the guiding frame comprises:

a second frame body vertically arranged at the bottom end of the supporting frame, wherein a first through groove is provided at a side edge of the second frame body;

a second supporting plate connected to a top end of the second frame body, wherein the second supporting plate is connected to the bottom end of the supporting frame, and a second through groove is provided on the second supporting plate; and a second guiding plate connecting an outer side of the second frame body to a bottom end of the second supporting plate, wherein a third through groove is provided on the second guiding plate, and the third through groove causes the first through groove to be in communication with the second through groove, so as to form the second heat dissipating channels.

17. The panoramic camera according to claim 16, wherein a baffle is arranged at a top end of the second supporting plate, heat dissipating fins are arranged at the top end of the second supporting plate, the heat dissipating fins are located above the second through hole, and the heat dissipating fins are located between an out ring of the first frame body and the baffle.

* * * * *